(12) United States Patent
Lee

(10) Patent No.: US 12,242,135 B2
(45) Date of Patent: Mar. 4, 2025

(54) IMAGING LENS SYSTEM

(71) Applicant: SAMSUNG ELECTRO-MECHANICS CO., LTD., Suwon-si (KR)

(72) Inventor: Da Ye Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 435 days.

(21) Appl. No.: 17/715,179

(22) Filed: Apr. 7, 2022

(65) Prior Publication Data

US 2023/0161135 A1  May 25, 2023

(30) Foreign Application Priority Data

Nov. 25, 2021  (KR) ........................ 10-2021-0164503

(51) Int. Cl.
*G02B 9/62*  (2006.01)

(52) U.S. Cl.
CPC ..................... *G02B 9/62* (2013.01)

(58) Field of Classification Search
None
See application file for complete search history.

(56) References Cited

U.S. PATENT DOCUMENTS

| 2017/0299846 A1 | 10/2017 | Lin et al. |
| 2017/0307849 A1 | 10/2017 | Jhang et al. |
| 2018/0056869 A1 | 3/2018 | Nagano |
| 2018/0172961 A1 | 6/2018 | Wu et al. |
| 2018/0203207 A1 | 7/2018 | Chen et al. |
| 2020/0049948 A1 | 2/2020 | Kuo |
| 2020/0371318 A1 | 11/2020 | Wu et al. |
| 2022/0091389 A1 | 3/2022 | Tian |
| 2022/0128793 A1 | 4/2022 | Teraoka |

FOREIGN PATENT DOCUMENTS

| CN | 102736218 A | 10/2012 |
| CN | 106610518 A | 5/2017 |
| CN | 107783256 A | 3/2018 |
| CN | 108205185 A | 6/2018 |
| CN | 108333712 A | 7/2018 |

(Continued)

OTHER PUBLICATIONS

Taiwanese Office Action issued on Aug. 29, 2022, in counterpart Taiwanese Patent Application No. 111114151 (3 pages in English and 4 pages in Chinese).

(Continued)

*Primary Examiner* — Stephone B Allen
*Assistant Examiner* — Tamara Y. Washington
(74) *Attorney, Agent, or Firm* — NSIP Law

(57) ABSTRACT

An imaging lens system includes a first lens, a second lens, a third lens, a fourth lens, a fifth lens, and a sixth lens disposed in order from an object side, wherein the imaging lens system satisfies conditional expressions of $0.23$ mm/°$<D1/HFOV<0.35$ mm/° and $0.15<ImgH/TTL<0.20$, where D1 is an effective diameter of the first lens, HFOV is a field of view of the imaging plane in a horizontal direction, ImgH is a height of the imaging plane, TTL is a distance from an object-side surface of the first lens to the imaging plane.

20 Claims, 20 Drawing Sheets

(56) References Cited

FOREIGN PATENT DOCUMENTS

| | | | |
|---|---|---|---|
| CN | 111830690 A | 10/2020 | |
| CN | 111929812 A | 11/2020 | |
| CN | 111999863 A * | 11/2020 | ......... G02B 13/0045 |
| CN | 112014946 A * | 12/2020 | ......... G02B 13/0045 |
| CN | 112255765 A | 1/2021 | |
| CN | 212873049 U | 4/2021 | |
| CN | 213814109 U | 7/2021 | |
| CN | 213814111 U | 7/2021 | |
| CN | 113238343 A | 8/2021 | |
| CN | 113238345 A | 8/2021 | |
| CN | 113267872 A | 8/2021 | |
| CN | 113391428 A | 9/2021 | |
| CN | 113433660 A | 9/2021 | |
| CN | 113625423 A | 11/2021 | |
| JP | 2015-125405 A | 7/2015 | |
| KR | 10-2021-0109495 A | 9/2021 | |

OTHER PUBLICATIONS

Korean Office Action Issued on Apr. 17, 2024, in Counterpart Korean Patent Application No. 10-2021-0164503 (5 Pages in English, 4 Pages in Korean).

Chinese Office Action issued on Aug. 3, 2024, in corresponding China Patent Application No. 202210854807.6. (7 pages in English, 9 pages in Chinese).

Chinese Office Action issued on Mar. 25, 2024, in counterpart Chinese Patent Application No. 202210854807.6 (8 pages in English, 13 pages in Chinese).

Korean Office Action issued on Dec. 10, 2024, in counterpart Korean Patent Application No. 10-2021-0164503 (6 pages in English, 5 pages in Korean).

Chinese Office Action issued on Oct. 30, 2024, in counterpart Chinese Patent Application No. 202210854807.6 (4 pages in English, 6 pages in Chinese).

* cited by examiner

IMAGING LENS SYSTEM

CROSS-REFERENCE TO RELATED APPLICATIONS

This application claims the benefit under 35 USC 119(a) of Korean Patent Application No. 10-2021-0164503 filed on Nov. 25, 2021, in the Korean Intellectual Property Office, the entire disclosure of which is incorporated herein by reference for all purposes.

BACKGROUND

1. Field

Embodiments of the present disclosure relate to an imaging lens system. For example, embodiments of the present disclosure relate to an imaging lens system mountable on a rear camera of a vehicle and a camera for autonomous driving of a vehicle.

2. Description of the Background

Vehicles may include a camera to reduce damage to persons and property caused by traffic accidents. For example, one or more cameras may be installed on front and rear bumpers of a vehicle to provide a driver with information on objects located to the front and rear of the vehicle. A vehicle camera may require high-resolution performance as it is important for a vehicle camera to recognize objects around a vehicle and to provide the recognized information to a driver. However, it may be difficult for a vehicle camera to implement high resolution due to limitations in an installation location. For example, to implement a vehicle camera having a certain f number, it may be necessary to increase diameters of a front lens and other lenses, but due to structural and design limitations of vehicle components (e.g., a bumper) on which a camera is installed, it may be difficult to arbitrarily change sizes of the lenses.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, and a sixth lens disposed in order from an object side, wherein the imaging lens system satisfies conditional expressions of 0.23 mm/°<D1/HFOV<0.35 mm/° and 0.15<ImgH/TTL<0.20, where D1 is an effective diameter of the first lens, HFOV is a field of view of the imaging plane in a horizontal direction, ImgH is a height of the imaging plane, and TTL is a distance from an object-side surface of the first lens to the imaging plane.

The first lens may have a concave image-side surface.
The third lens may have a convex object-side surface.
The fourth lens may have a convex object-side surface.
The fifth lens may have a concave object-side surface.
The sixth lens may have positive refractive power.

The imaging lens system may satisfy a conditional expression of 2.5<TTL/f<3.2, where f is a focal length of the imaging lens system.

The imaging lens system may satisfy a conditional expression of 0.6<|f/f3|<1.6, where f is a focal length of the imaging lens system and f3 is a focal length of the third lens.

The imaging lens system may satisfy a conditional expression of 0.3<D1/TTL<0.6.

The imaging lens system may satisfy a conditional expression of f2/f3<0, where f2 is a focal length of the second lens and f3 is a focal length of the third lens.

The imaging lens system may satisfy a conditional expression of f4/f5<0, where f4 is a focal length of the fourth lens and f5 is a focal length of the fifth lens.

In another general aspect, an imaging lens system includes a first lens having a concave image-side surface, a second lens having refractive power, a third lens having positive refractive power and having a convex image-side surface, a fourth lens having refractive power, a fifth lens having refractive power, and a sixth lens having refractive power, wherein the first to sixth lenses are disposed in order from the object side, and wherein the imaging lens system satisfies a conditional expression of 2.5<TTL/f<3.2, where f is a focal length of the imaging lens system and TTL is a distance from an object-side surface of the first lens to an imaging plane.

The imaging lens system may satisfy a conditional expression of −2.4<f2/f3<−0.6, where f2 is a focal length of the second lens and f3 is a focal length of the third lens.

The imaging lens system may satisfy a conditional expression of −1.6<f4/f5<−0.8, where f4 is a focal length of the fourth lens and f5 is a focal length of the fifth lens.

The imaging lens system may satisfy a conditional expression of 1.6<f number<2.1.

The imaging lens system may satisfy a conditional expression of 0.4<ImgH/f<0.6, where ImgH is a height of the imaging plane.

In another general aspect, an imaging lens system includes a first lens having a concave image-side surface, a second lens having refractive power, a third lens having positive refractive power and having a convex image-side surface, a fourth lens having refractive power, a fifth lens having refractive power, and a sixth lens having refractive power, wherein the first to sixth lenses are disposed in order from the object side, and wherein the imaging lens system satisfies a conditional expression of 0.23 mm/°<D1/HFOV<0.35 mm/°, where D1 is an effective diameter of the first lens and HFOV is a field of view of an imaging plane in a horizontal direction.

The imaging lens system may satisfy a conditional expression of 0.15<ImgH/TTL<0.20, where ImgH is a height of the imaging plane and TTL is a distance from an object-side surface of the first lens to the imaging plane.

The imaging lens system may satisfy a conditional expression of 2.5<TTL/f<3.2, where f is a focal length of the imaging lens system and TTL is a distance from an object-side surface of the first lens to an imaging plane.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
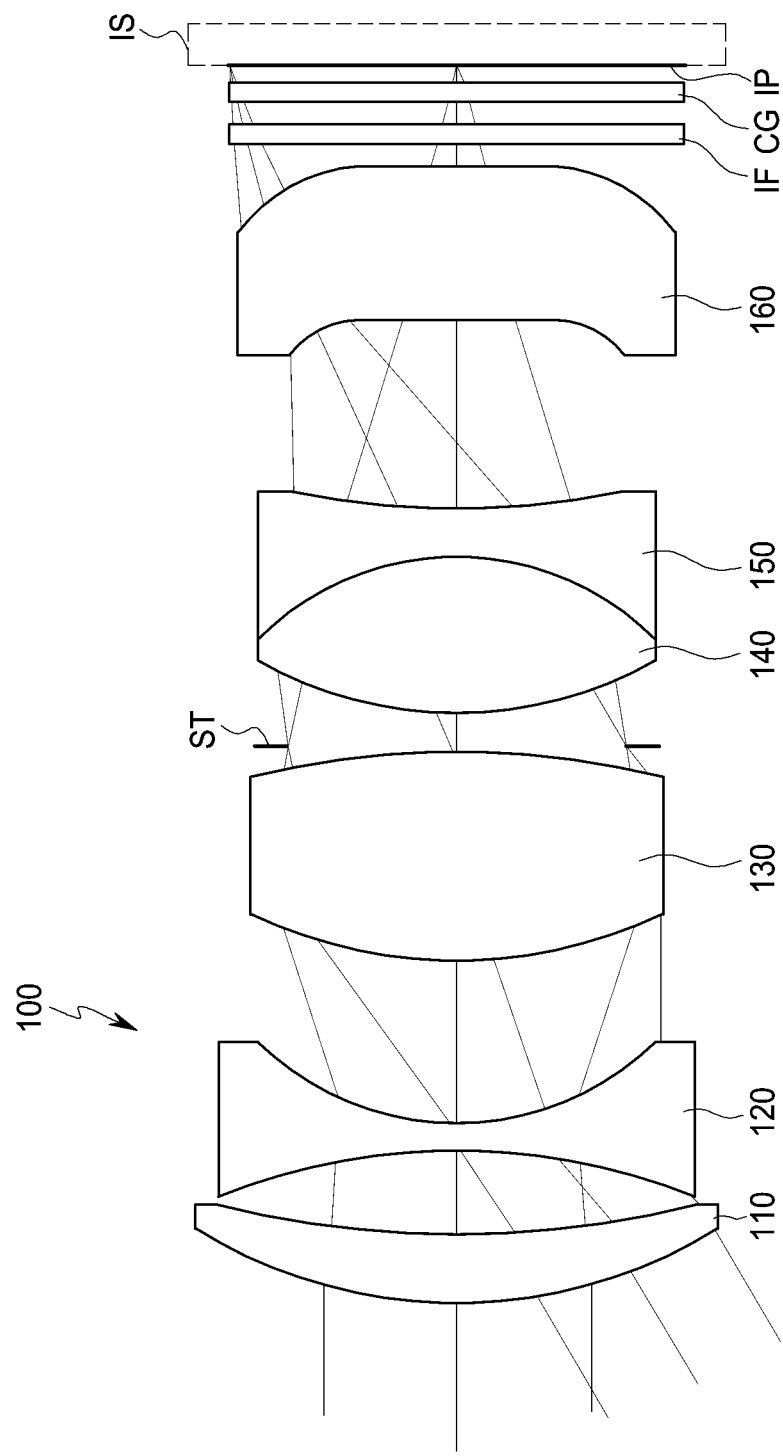
FIG. 1 is a diagram illustrating an imaging lens system according to a first embodiment of the present disclosure.

Hereinafter, while example embodiments of the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there may be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Herein, it is noted that use of the term "may" with respect to an example, for example, as to what an example may include or implement, means that at least one example exists in which such a feature is included or implemented while all examples are not limited thereto.

The features of the examples described herein may be combined in various ways as will be apparent after an understanding of this disclosure. Further, although the examples described herein have a variety of configurations, other configurations are possible as will be apparent after an understanding of this disclosure.

An embodiment of the present disclosure is to provide an imaging lens system which may reduce changes in sizes of lenses and may implement high resolution.

In the embodiments, a first lens refers to a lens most adjacent to an object (or a subject), and a sixth lens refers to a lens most adjacent to an imaging plane (or an image sensor). In the embodiments, a unit of a radius of curvature, a thickness, a TTL (a distance from an object-side surface of the first lens to an imaging plane), an ImgH (a height of an imaging plane), a focal length, and an effective diameter are indicated in millimeters (mm).

A thickness of a lens, a gap between lenses, and a TTL refer to a distance of a lens in an optical axis. Also, in the descriptions of a shape of a lens, the configuration in which one surface is convex indicates that a paraxial region of the surface is convex, and the configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

The imaging lens system described in embodiments may be configured to be mounted on a transport device. For example, the imaging lens system may be mounted on a front and rear surveillance camera or an autonomous driving camera mounted on a passenger car, a truck, a fire truck, a forklift, and the like. However, the embodiments of the imaging lens system are not limited to the above-described examples. For example, the imaging lens system may be mounted on an imaging camera of a surveillance drone or a transport drone.

The imaging lens system according to the first embodiment may include a plurality of lenses. For example, the imaging lens system may include a first lens, a second lens, a third lens, a fourth lens, a fifth lens, and a sixth lens disposed in order from an object side.

The imaging lens system in the first embodiment may satisfy a specific conditional expression. For example, the imaging lens system in the first embodiment may satisfy a conditional expression of 0.23 mm/°<D1/HFOV<0.35 mm/° with respect to an effective diameter D1 of the first lens and a field of view HFOV of the imaging plane in the horizontal direction. Also, the imaging lens system in the first embodiment may satisfy a conditional expression of 0.15<ImgH/TTL<0.20 with respect to a height ImgH of the imaging plane and a TTL.

An imaging lens system according to a second embodiment may include a plurality of lenses. For example, the imaging lens system may include a first lens, a second lens, a third lens, a fourth lens, a fifth lens, and a sixth lens disposed in order from an object side.

The imaging lens system in the second embodiment may include a lens having a predetermined shape. For example, the imaging lens system according to the second embodiment may include a first lens having a concave image-side surface and a third lens having a convex image-side surface. Also, the imaging lens system according to the second embodiment may include a lens having predetermined refractive power. For example, the imaging lens system according to the second embodiment may include a third lens having positive refractive power.

The imaging lens system according to the second embodiment may satisfy a specific conditional expression. For example, the imaging lens system according to the second embodiment may satisfy the conditional expression $2.5<TTL/f<3.2$ with respect to a TTL and a focal length f of the imaging lens system.

The imaging lens system according to the third embodiment may be configured to satisfy one or more conditional expressions. As an example, the imaging lens system according to the third embodiment may include six lenses, and may satisfy two or more conditional expressions. As another example, the imaging lens system according to the third embodiment may include six lens, and may be configured to satisfy overall conditional expressions as below:

$$2.5<TTL/f<3.2$$

$$0.6<|f/f3|<1.6$$

$$0.3<D1/TTL<0.6$$

$$f2/f3<0$$

$$f4/f5<0$$

$$55°<DFOV<61°$$

$$5.0°/mm<DFOV/f<6.0°/mm$$

$$25\ mm<|f45|<70\ mm$$

In the conditional expressions above, TTL is a distance from an object-side surface of the first lens to the imaging plane, f is a focal length of the imaging lens system, f2 is a focal length of the second lens, f3 is a focal length of the third lens, f5 is a focal length of the fifth lens, DFOV is a field of view of the imaging plane in the diagonal direction, and f45 is a combined focal length of the fourth and fifth lenses. Furthermore, f1 is a focal length of the first lens and f6 is a focal length of the sixth lens.

The imaging lens system may satisfy a portion of the aforementioned conditional expressions in a further limited manner as below:

$$-2.4<f2/f3<-0.6$$

$$-1.6<f4/f5<-0.8$$

An imaging lens system according to the fourth embodiment may be configured to satisfy one or more conditional expressions. For example, the imaging lens system according to the fourth embodiment may include six lenses, and may satisfy two or more conditional expressions. As another example, the imaging lens system according to the fourth embodiment may include six lenses, and may be configured to satisfy overall conditional expressions as below:

$$1.6<f\ number<2.1$$

$$0.4<ImgH/f<0.6$$

$$-0.6<(R5+R6)/(R5-R6)<0.4$$

$$-0.5<(R2+R6)/(R2-R6)<0.6$$

$$1.70<(Nd1+Nd3)/2<1.90$$

$$1.60<(Nd1+Nd3+Nd5)/3<1.90$$

$$40<(V1+V2+V3+V4)/4<46$$

$$40<SumV/6<50$$

$$1.62<SumNd/6<1.82$$

$$0.24<D12/D23<0.76$$

In the conditional expression above, ImgH is a height of the imaging plane, R2 is a radius of curvature of an image-side surface of the first lens, R5 is a radius of curvature of an object-side surface of the third lens, R6 is a radius of curvature of an image-side surface of the third lens, Nd1 is a refractive index of the first lens, Nd3 is a refractive index of the third lens, Nd5 is a refractive index of the fifth lens, V1 is an Abbe number of the first lens, V2 is an Abbe number of the second lens, V3 is an Abbe number of the third lens, V4 is an Abbe number of the fourth lens, SumV is a sum of Abbe numbers of the first to sixth lenses, SumNd is a sum of the refractive indices of the first to sixth lenses, D12 is a distance from the image-side surface of the first lens to the object-side surface of the second lens, and D23 is a distance from the image-side surface of the second lens to the object-side surface of the third lens.

The imaging lens system in the embodiments may include one or more lenses having properties as below, if desired. For example, the imaging lens system according to the first embodiment may include one of the first to sixth lenses according to properties as below. As another example, the imaging lens system according to the second to fourth embodiments may include one or more of the first to sixth lenses according to properties as below. However, the imaging lens system in the aforementioned embodiments does not necessarily include the lens according to the properties as below. Hereinafter, properties of the first to sixth lenses will be described.

The first lens may have refractive power. For example, the first lens may have positive or negative refractive power. One surface of the first lens may be concave. For example, the first lens may have a concave image-side surface. The first lens may include a spherical surface or an aspherical surface. For example, both surfaces of the first lens may be spherical. As another example, both surfaces of the first lens may be aspherical. For reference, both surfaces of the first lens may be aspherical only when both surfaces of the second lens are spherical. The first lens may be formed of a material having high light transmissivity and excellent workability. For example, the first lens may be formed of a plastic material or a glass material. The first lens may be configured to have a predetermined refractive index. For example, the refractive index of the first lens may be greater than 1.7. As a specific example, the refractive index of the first lens may be greater than 1.70 and less than 1.79. However, the refractive index of the first lens is not limited to the aforementioned range. For example, the first lens may have a refractive index less than 1.7 only when the refractive index of the second lens is greater than 1.7. The first lens may have a predetermined Abbe number. For example, the Abbe number of the first lens may be 40 or more. As a specific example, the Abbe number of the first lens may be greater than 40 and less than 80.

The second lens may have refractive power. For example, the second lens may have positive or negative refractive power. One surface of the second lens be concave. For example, the second lens may have a concave object-side surface or a concave image-side surface. The second lens may include a spherical surface or an aspherical surface. For example, both surfaces of the second lens may be aspherical. As another example, both surfaces of the second lens may be spherical. The second lens may be formed of a material having high light transmissivity and excellent workability. For example, the second lens may be formed of a plastic material or a glass material. The second lens may be configured to have a predetermined refractive index. For example, the refractive index of the second lens may be greater than 1.5. As a specific example, the refractive index of the second lens may be greater than 1.5 and less than 1.9. The second lens may have a predetermined Abbe number. For example, the Abbe number of the second lens may be 30 or more. As a specific example, the Abbe number of the second lens may be greater than 30 and less than 50.

The third lens may have refractive power. For example, the third lens may have positive refractive power. One surface of the third lens may be convex. For example, the third lens may have a convex object-side surface or a convex image-side surface. As another example, the third lens may have a convex object-side surface and a convex image-side surface. The third lens may include a spherical surface or an aspherical surface. For example, both surfaces of the third lens may be aspherical. The third lens may be formed of a material having high light transmissivity and excellent workability. For example, the third lens may be formed of a plastic material or a glass material. The third lens may be configured to have a predetermined refractive index. For example, the refractive index of the third lens may be greater than 1.7 and less than 1.9. However, the refractive index of the third lens may not satisfy the aforementioned numerical range only when the refractive index of the first lens is less than 1.6. The third lens may have a predetermined Abbe number. For example, the Abbe number of the third lens may be greater than 30 and less than 70.

The fourth lens may have refractive power. For example, the fourth lens may have positive or negative refractive power. Both surfaces of the fourth lens may be symmetrical. For example, both surfaces of the fourth lens may be convex or concave. The fourth lens may include a spherical surface. For example, both surfaces of the fourth lens may be spherical. The fourth lens may be formed of a material having high light transmissivity and excellent workability. For example, the fourth lens may be formed of a plastic material or a glass material. The fourth lens may be configured to have a predetermined refractive index. For example, the refractive index of the fourth lens may be greater than 1.67 and less than 1.89. The fourth lens may have a predetermined Abbe number. For example, the Abbe number of the fourth lens may be greater than 20 and less than 56.

The fifth lens may have refractive power. For example, the fifth lens may have positive or negative refractive power. Both surfaces of the fifth lens may be symmetrical. For example, both surfaces of the fifth lens may be convex or concave. The fifth lens may include a spherical surface. For example, both surfaces of the fifth lens may be spherical. The fifth lens may be formed of a material having high light transmissivity and excellent workability. For example, the fifth lens may be formed of a plastic material or a glass material. The fifth lens may be configured to have a predetermined refractive index. For example, the refractive index of the fifth lens may be greater than 1.7. As a specific example, the refractive index of the fifth lens may be greater than 1.70 and less than 1.89. The fifth lens may have a predetermined Abbe number. For example, the Abbe number of the fifth lens may be less than 50. As a specific example, the Abbe number of the fifth lens may be greater than 20 and less than 50.

The sixth lens may have refractive power. For example, the sixth lens may have positive or negative refractive power. One surface of the sixth lens may convex or concave. For example, the sixth lens may have a convex object-side surface or a convex image-side surface. As another example, the sixth lens may have a concave object-side surface or a concave image-side surface. The sixth lens may include an aspherical surface. For example, both surfaces of the sixth lens may be aspherical. The sixth lens may be formed of a material having high light transmissivity and excellent workability. For example, the sixth lens may be formed of a plastic material or a glass material. The sixth lens may be configured to have a predetermined refractive index. For example, the refractive index of the sixth lens may be greater than 1.50 and less than 1.70. The sixth lens may have a predetermined Abbe number. For example, the Abbe number of the sixth lens may be greater than 40 and less than 70.

The first to sixth lenses may include a spherical surface or an aspherical surface as described above. When the first to sixth lenses include an aspherical surface, the aspherical surface of the corresponding lens may be represented by equation 1.

$$Z = \frac{cr^2}{1 + \sqrt{1 - (1+k)c^2r^2}} + Ar^4 + Br^6 + Cr^8 + Dr^{10} + Er^{12} + Fr^{14} + Gr^{16} + Hr^{18} + Jr^{20}$$

Equation 1

In equation 1, c is a reciprocal of a radius of curvature of the corresponding lens, k is a conic constant, r is a distance from an arbitrary point on the aspherical surface to an optical axis, A to H and J are aspherical constants, and Z (or SAG) is a height from an arbitrary point on the aspherical surface to an apex of the aspherical surface in the optical axis direction.

The imaging lens system according to the above-described embodiment may further include a stop, a filter, and a cover glass. As an example, the imaging lens system may further include a stop disposed between the second lens and the third lens or between the third lens and the fourth lens. As another example, the imaging lens system may further include a filter and a cover glass disposed between the sixth lens and the imaging plane. The stop may be configured to adjust the amount of light incident in the direction of the imaging plane. The filter may be configured to block light within a specific wavelength, and the cover glass may be configured to block foreign substances, and the like, entering in the direction of the imaging plane. For reference, the filter described in the embodiments may be configured to block infrared rays, but may be configured to block ultraviolet rays if desired.

Hereinafter, a specific embodiment of an imaging lens system will be described with reference to the drawings.

An imaging lens system according to a first embodiment will be described with reference to FIG. 1.

The imaging lens system 100 may include a first lens 110, a second lens 120, a third lens 130, a fourth lens 140, a fifth lens 150, and a sixth lens 160.

The first lens 110 may have positive refractive power, and may have a convex object-side surface and a concave image-side surface. The second lens 120 may have negative refractive power, and may have a concave object-side surface and a concave image-side surface. The third lens 130 may have positive refractive power, and may have a convex object-side surface and a convex image-side surface. The fourth lens 140 may have positive refractive power, and may have a convex object-side surface and a convex image-side surface. The fifth lens 150 may have negative refractive power, and may have a concave object-side surface and a concave image-side surface. The sixth lens 160 may have positive refractive power, and may have a convex object-side surface and a concave image-side surface. An inflection point may be formed on the object-side surface and the image-side surface of the sixth lens 160. In the embodiment, the fourth lens 140 and the fifth lens 150 may be bonded to each other. In greater detail, a radius of curvature of the image-side surface of the fourth lens 140 and a radius of curvature of the object-side surface of the fifth lens 150 may be configured to be the same, and an air gap between the image-side surface of the fourth lens 140 and the object-side surface of the fifth lens 150 may be substantially approximate to zero.

The imaging lens system 100 may further include a stop ST, a filter IF, a cover glass CG, and an imaging plane IP. The stop ST may be disposed between the third lens 130 and the fourth lens 140, and the filter IF and the cover glass CG may be disposed between the sixth lens 160 and the imaging plane IP. The imaging plane IP may be formed in a position in which light incident by the first lens 110 to the sixth lens 160 is formed. For example, the imaging plane IP may be formed on one surface of the image sensor IS of the camera module or within the image sensor IS.

Figure 2:
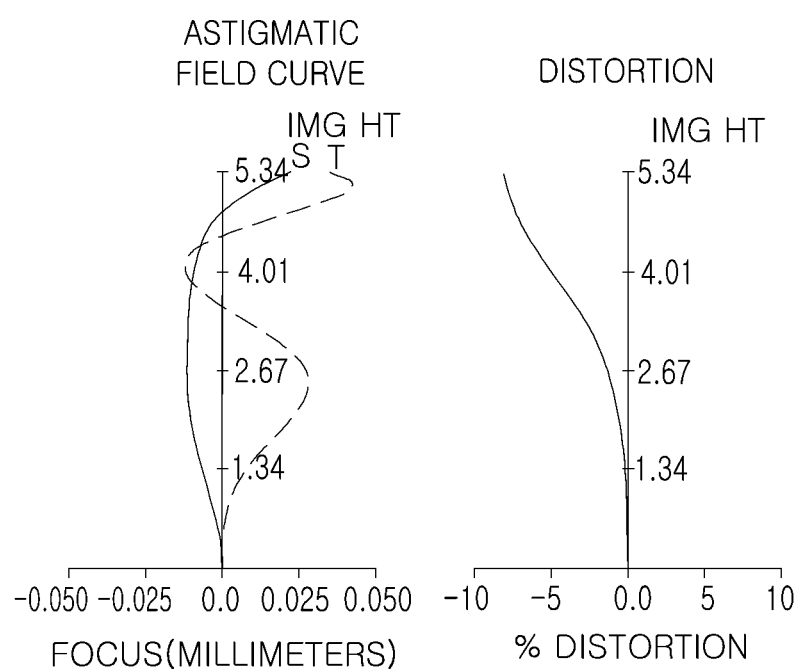
FIG. 2 presents aberration curves of the imaging lens system illustrated in FIG. 1.

Tables 1 and 2 list the lens properties and aspherical values of the imaging lens system according to the embodiment, and FIG. 2 presents aberration curves of the imaging lens system according to the embodiment.

TABLE 1

| Surface No. | Component | Radius of Curvature | Thickness/ Distance | Refractive Index | Abbe Number | Effective Diameter |
|---|---|---|---|---|---|---|
| S1 | First Lens | 11.920 | 1.550 | 1.776 | 49.6 | 6.037 |
| S2 | | 22.510 | 1.902 | | | 5.670 |
| S3 | Second Lens | −13.228 | 0.600 | 1.582 | 41.5 | 5.557 |
| S4 | | 6.264 | 3.693 | | | 4.626 |
| S5 | Third Lens | 12.284 | 4.730 | 1.888 | 40.8 | 4.801 |
| S6 | | −20.663 | 0.100 | | | 4.260 |
| S7 | Stop | Infinity | 0.760 | | | 3.931 |
| S8 | Fourth Lens | 9.489 | 3.515 | 1.707 | 48.8 | 4.170 |
| S9 | Fifth Lens | −6.589 | 1.147 | 1.813 | 24.1 | 4.026 |
| S10 | | 21.003 | 4.187 | | | 3.838 |
| S11 | Sixth Lens | 49.705 | 3.500 | 1.579 | 62.0 | 3.935 |
| S12 | | 6433.696 | 0.520 | | | 5.098 |
| S13 | Filter | Infinity | 0.400 | 1.519 | 64.2 | 5.240 |
| S14 | | Infinity | 0.562 | | | 5.260 |
| S15 | Cover Glass | Infinity | 0.400 | 1.519 | 64.2 | 5.301 |
| S16 | | Infinity | 0.435 | | | 5.321 |
| S17 | Imaging Plane | Infinity | 0.000 | | | 5.353 |

TABLE 2

| Surface No. | S3 | S4 | S11 | S12 |
|---|---|---|---|---|
| K | 5.442806E−01 | −1.567027E+00 | 0.000000E+00 | 0.000000E+00 |
| A | 2.165512E−04 | 5.902810E−04 | −1.948717E−03 | −8.032534E−04 |
| B | | | −1.404632E−04 | −1.053855E−04 |
| C | | | 1.190215E−05 | 2.275369E−06 |
| D | | | −1.106931E−06 | 4.361826E−09 |
| E | | | 2.610738E−08 | −3.299868E−10 |

Figure 3:
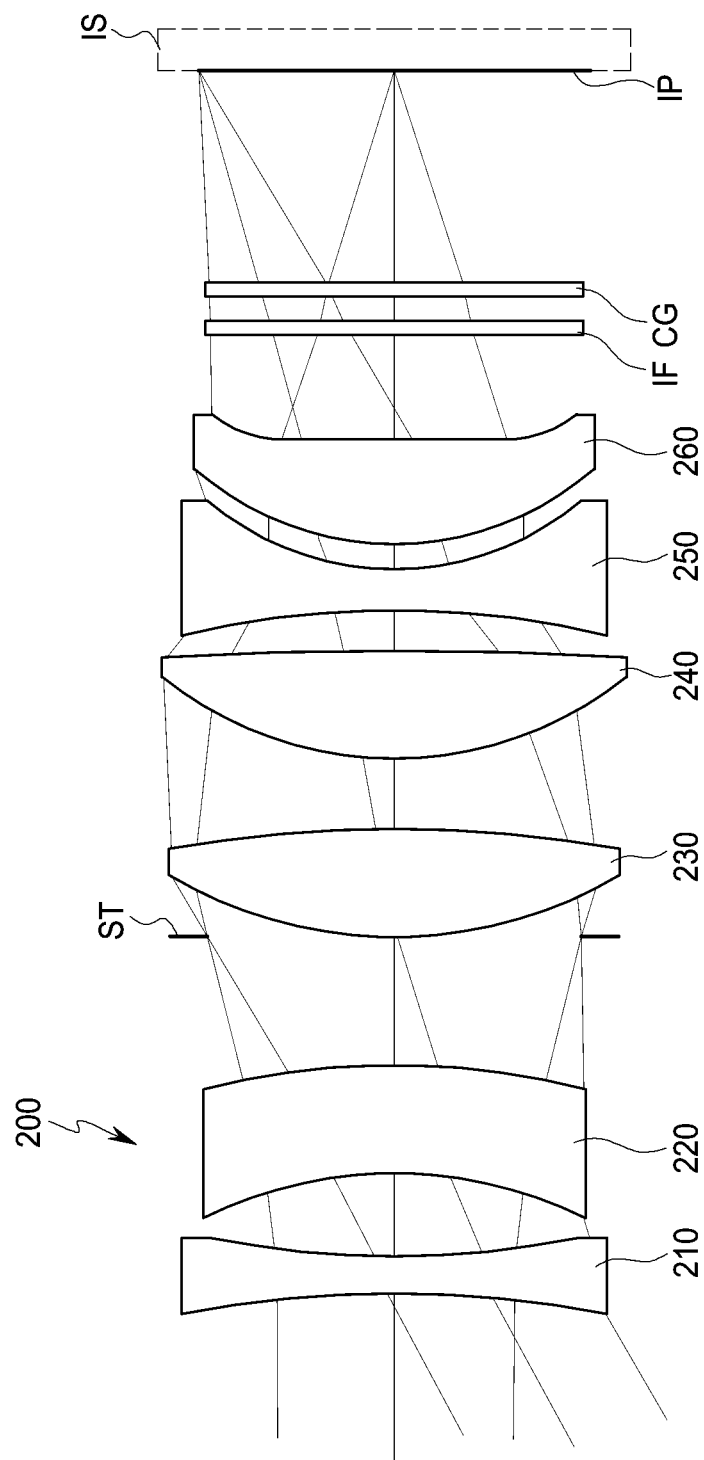
FIG. 3 is a diagram illustrating an imaging lens system according to a second embodiment of the present disclosure.

An imaging lens system according to a second embodiment will be described with reference to FIG. 3.

The imaging lens system 200 may include a first lens 210, a second lens 220, a third lens 230, a fourth lens 240, a fifth lens 250, and a sixth lens 260.

The first lens 210 may have negative refractive power, and may have a concave object-side surface and a concave image-side surface. The second lens 220 may have negative refractive power, and may have a concave object-side surface and a convex image-side surface. The third lens 230 may have positive refractive power, and may have a convex object-side surface and a convex image-side surface. The fourth lens 240 may have positive refractive power, and may have a convex object-side surface and a convex image-side surface. The fifth lens 250 may have negative refractive power, and may have a concave object-side surface and a concave image-side surface. The sixth lens 260 may have positive refractive power, and may have a convex object-side surface and a convex image-side surface. An inflection point may be formed on the object-side surface and the image-side surface of the sixth lens 260.

The imaging lens system 200 may further include a stop ST, a filter IF, a cover glass CG, and an imaging plane IP. The stop ST may be disposed between the second lens 220 and the third lens 230, and the filter IF and the cover glass CG may be disposed between the sixth lens 260 and the imaging plane IP. The imaging plane IP may be formed in a position in which light incident by the first lens 210 to the sixth lens 260 is formed. For example, the imaging plane IP may be formed on one surface of the image sensor IS of the camera module or within the image sensor IS.

Figure 4:
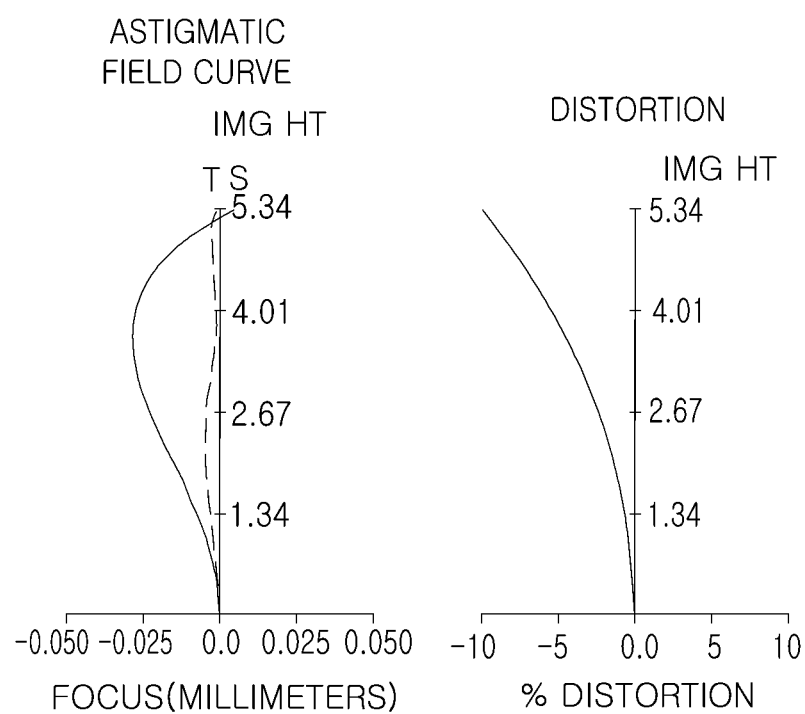
FIG. 4 presents aberration curves of the imaging lens system illustrated in FIG. 3.

Tables 3 and 4 list the lens properties and aspherical values of the imaging lens system according to the embodiment, and FIG. 4 presents aberration curves of the imaging lens system according to the embodiment.

TABLE 3

| Surface No. | Component | Radius of Curvature | Thickness/ Distance | Refractive Index | Abbe Number | Effective Diameter |
|---|---|---|---|---|---|---|
| S1 | First Lens | −28.092 | 1.000 | 1.552 | 75.5 | 5.776 |
| S2 | | 28.957 | 2.240 | | | 5.285 |
| S3 | Second Lens | −8.000 | 2.800 | 1.778 | 47.2 | 5.154 |
| S4 | | −12.976 | 3.383 | | | 5.197 |
| S5 | Stop | Infinity | 0.030 | | | 5.099 |
| S6 | Third Lens | 12.706 | 2.800 | 1.595 | 68.6 | 6.084 |
| S7 | | −41.239 | 1.913 | | | 6.145 |
| S8 | Fourth Lens | 10.508 | 2.830 | 1.777 | 49.5 | 6.302 |
| S9 | | −122.303 | 1.082 | | | 6.135 |
| S10 | Fifth Lens | −23.868 | 1.068 | 1.760 | 25.0 | 5.803 |
| S11 | | 8.147 | 0.680 | | | 5.145 |
| S12 | Sixth Lens | 11.511 | 2.800 | 1.777 | 49.5 | 5.433 |
| S13 | | −64.971 | 2.722 | | | 4.977 |
| S14 | Filter | Infinity | 0.400 | 1.519 | 64.2 | 5.066 |
| S15 | | Infinity | 0.550 | | | 5.077 |
| S16 | Cover Glass | Infinity | 0.400 | 1.519 | 64.2 | 5.100 |
| S17 | | Infinity | 5.659 | | | 5.111 |
| S18 | Imaging Plane | Infinity | 0.000 | | | 5.351 |

TABLE 4

| Surface No. | S3 | S4 | S12 | S13 |
|---|---|---|---|---|
| K | −9.881809E−02 | 7.777624E−01 | 4.252814E−04 | 7.288455E−04 |
| A | 7.535680E−04 | 5.706888E−04 | 6.576068E−06 | 1.581817E−05 |
| B | 4.310840E−06 | 3.752684E−06 | −4.022184E−09 | −1.540529E−07 |
| C | −2.453584E−08 | 7.155995E−09 | 4.084082E−09 | 1.929469E−08 |

Figure 5:
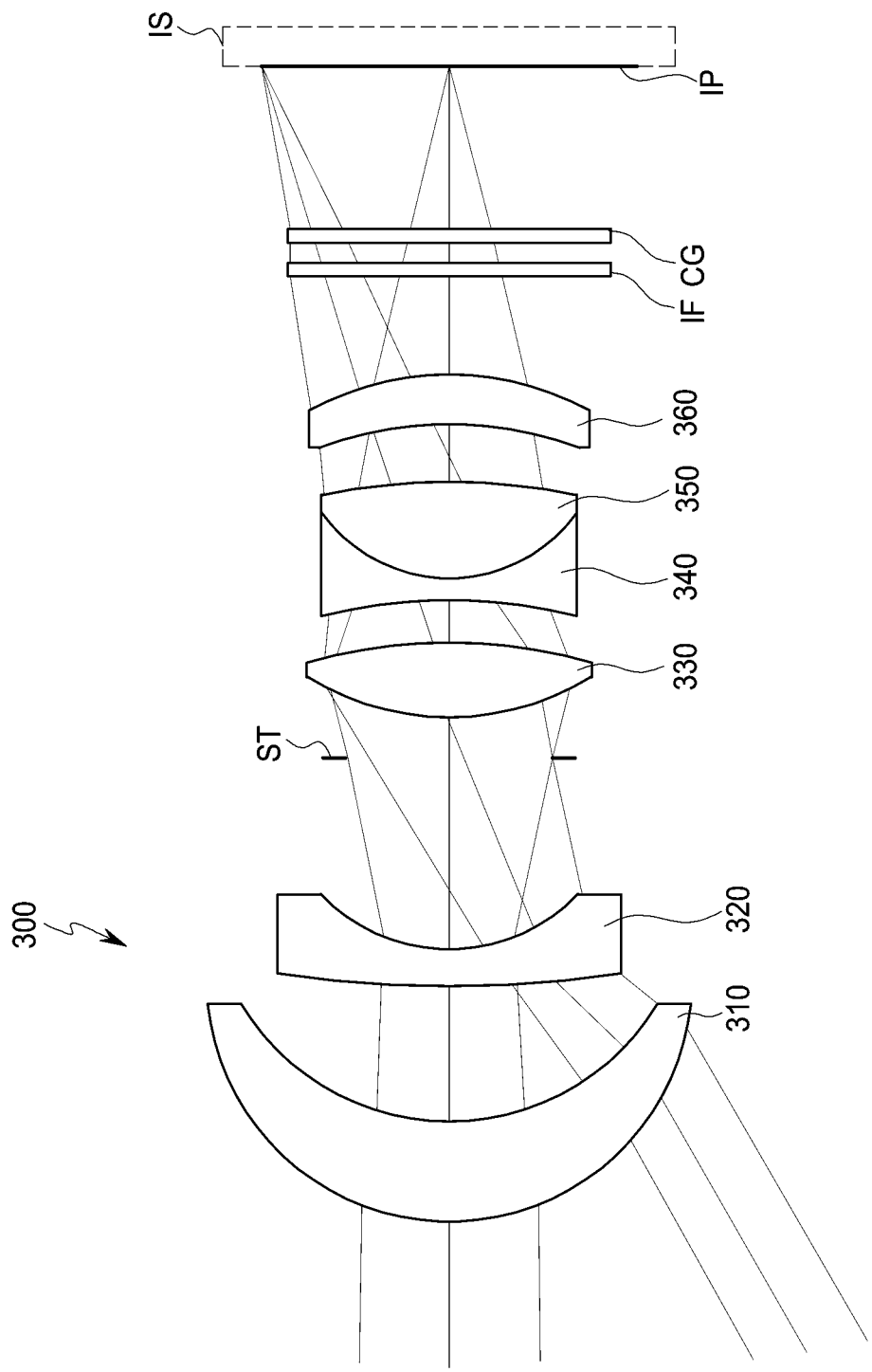
FIG. 5 is a diagram illustrating an imaging lens system according to a third embodiment of the present disclosure.

An imaging lens system according to a third embodiment will be described with reference to FIG. 5.

The imaging lens system 300 may include a first lens 310, a second lens 320, a third lens 330, a fourth lens 340, a fifth lens 350, and a sixth lens 360.

The first lens 310 may have positive refractive power, and may have a convex object-side surface and a concave image-side surface. The second lens 320 may have negative refractive power, and may have a convex object-side surface and a concave image-side surface. The third lens 330 may have positive refractive power, and may have a convex object-side surface and a convex image-side surface. The fourth lens 340 may have negative refractive power, and may have a concave object-side surface and a concave image-side surface. The fifth lens 350 may have positive refractive power, and may have a convex object-side surface and a convex image-side surface. The sixth lens 360 may have positive refractive power, and may have a concave object-side surface and a convex image-side surface. An inflection point may be formed on the object-side surface and the image-side surface of the sixth lens 360. In the embodiment, the fourth lens 340 and the fifth lens 350 may be bonded to each other. In greater detail, a radius of curvature of the image-side surface of the fourth lens 340 and a radius of curvature of the object-side surface of the fifth lens 350 may be configured to be the same, and an air gap between the image-side surface of the fourth lens 340 and the object-side surface of the fifth lens 350 may be substantially approximate to zero.

The imaging lens system 300 may further include a stop ST, a filter IF, a cover glass CG, and an imaging plane IP. The stop ST may be disposed between the second lens 320 and the third lens 330, and the filter IF and the cover glass CG may be disposed between the sixth lens 360 and the imaging plane IP. The imaging plane IP may be formed in a position in which light incident by the first lens 310 to the sixth lens 360 is formed. For example, the imaging plane IP may be formed on one surface of the image sensor IS of the camera module or within the image sensor IS.

Figure 6:
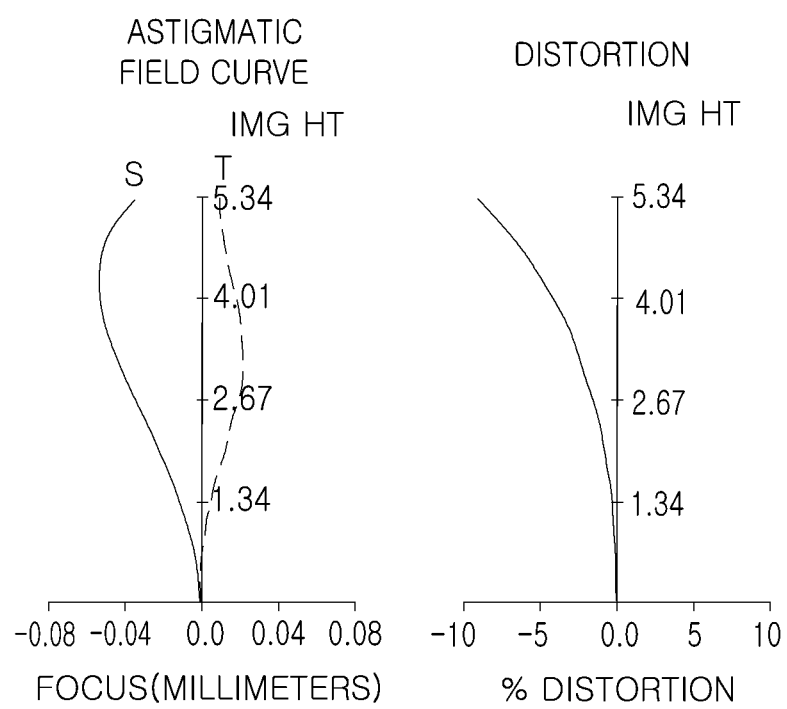
FIG. 6 presents aberration curves of the imaging lens system illustrated in FIG. 5.

Tables 5 and 6 list the lens properties and aspherical values of the imaging lens system according to the embodiment, and FIG. 6 presents aberration curves of the imaging lens system according to the embodiment.

TABLE 5

| Surface No. | Component | Radius of Curvature | Thickness/ Distance | Refractive Index | Abbe Number | Effective Diameter |
|---|---|---|---|---|---|---|
| S1 | First Lens | 6.934 | 2.778 | 1.777 | 49.6 | 6.863 |
| S2 | | 6.960 | 3.740 | | | 5.866 |
| S3 | Second Lens | 26.480 | 1.000 | 1.884 | 41.0 | 4.848 |
| S4 | | 5.252 | 5.325 | | | 3.685 |
| S5 | Stop | Infinity | 1.111 | | | 2.945 |
| S6 | Third Lens | 7.877 | 2.067 | 1.779 | 36.2 | 4.034 |
| S7 | | −13.424 | 1.226 | | | 4.010 |
| S8 | Fourth Lens | −13.414 | 0.515 | 1.820 | 26.3 | 3.654 |
| S9 | Fifth Lens | 4.445 | 2.658 | 1.782 | 44.7 | 3.601 |
| S10 | | −25.639 | 1.675 | | | 3.654 |
| S11 | Sixth Lens | −13.412 | 1.306 | 1.595 | 68.6 | 3.727 |
| S12 | | −7.265 | 2.722 | | | 4.011 |
| S13 | Filter | Infinity | 0.400 | 1.519 | 64.2 | 4.541 |
| S14 | | Infinity | 0.550 | | | 4.579 |
| S15 | Cover Glass | Infinity | 0.400 | 1.519 | 64.2 | 4.658 |
| S16 | | Infinity | 4.526 | | | 4.695 |
| S17 | Imaging Plane | Infinity | 0.001 | | | 5.352 |

TABLE 6

| Surface No. | S3 | S4 | S6 | S7 | S11 | S12 |
|---|---|---|---|---|---|---|
| K | 0.00000E+00 | 0.00000E+00 | 0.00000E+00 | 0.00000E+00 | 9.62630E+00 | 1.19220E+00 |
| A | −2.00556E−04 | 2.00965E−04 | 2.80697E−05 | 3.86819E−04 | 4.40961E−04 | 1.41768E−03 |
| B | 2.75929E−06 | −1.34756E−07 | 2.12179E−06 | −4.90220E−07 | 1.30091E−06 | 2.73979E−05 |
| C | | | | | 7.61748E−10 | −4.20402E−07 |
| D | | | | | −8.97563E−08 | −1.56414E−08 |

Figure 7:
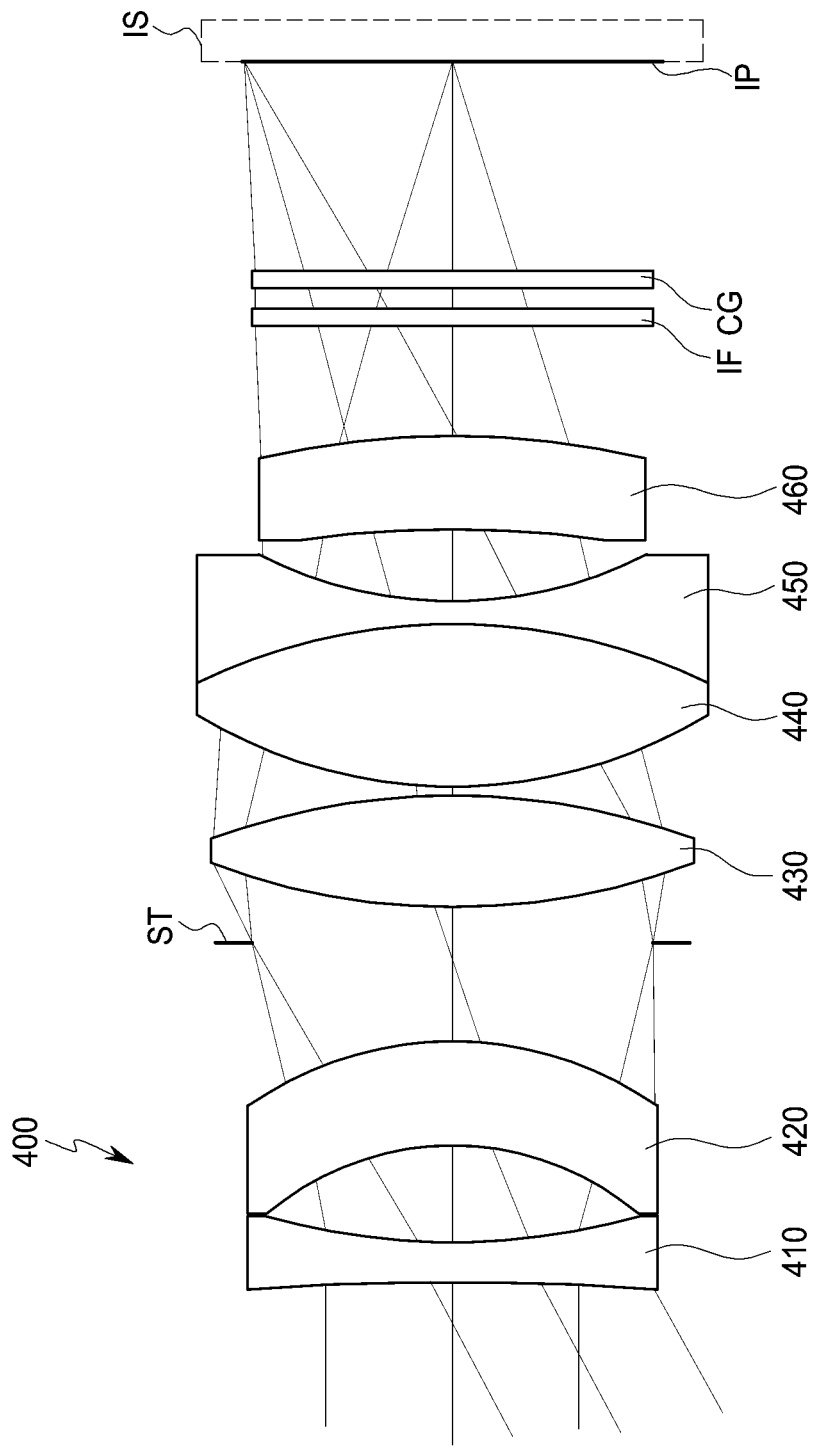
FIG. 7 is a diagram illustrating an imaging lens system according to a fourth embodiment of the present disclosure.

An imaging lens system according to a fourth embodiment will be described with reference to FIG. 7.

The imaging lens system 400 may include a first lens 410, a second lens 420, a third lens 430, a fourth lens 440, a fifth lens 450, and a sixth lens 460.

The first lens 410 may have negative refractive power, and may have a concave object-side surface and a concave image-side surface. The second lens 420 may have positive refractive power, and may have a concave object-side surface and a convex image-side surface. The third lens 430 may have positive refractive power, and may have a convex object-side surface and a convex image-side surface. The fourth lens 440 may have positive refractive power, and may have a convex object-side surface and a convex image-side surface. The fifth lens 450 may have negative refractive power, and may have a concave object-side surface and a concave image-side surface. The sixth lens 460 may have positive refractive power, and may have a concave object-side surface and a convex image-side surface. An inflection point may be formed on the object-side surface and the image-side surface of the sixth lens 460. In the embodiment, the fourth lens 440 and the fifth lens 450 may be bonded to each other. In greater detail, a radius of curvature of the image-side surface of the fourth lens 440 and a radius of curvature of the object-side surface of the fifth lens 350 may be configured to be the same, and an air gap between the image-side surface of the fourth lens 440 and the object-side surface of the fifth lens 450 may be substantially approximate to zero.

The imaging lens system 400 may further include a stop ST, a filter IF, a cover glass CG, and an imaging plane IP. The stop ST may be disposed between the second lens 420 and the third lens 430, and the filter IF and the cover glass CG may be disposed between the sixth lens 460 and the imaging plane IP. The imaging plane IP may be formed in a position in which light incident by the first lens 410 to the sixth lens 460 is formed. For example, the imaging plane IP may be formed on one surface of the image sensor IS of the camera module or within the image sensor IS.

Figure 8:
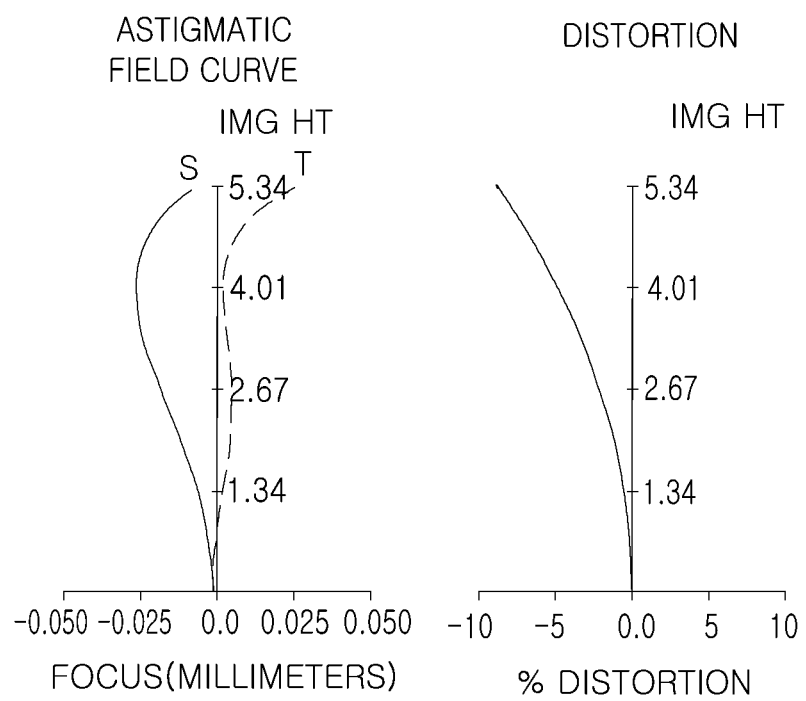
FIG. 8 presents aberration curves of the imaging lens system illustrated in FIG. 7.

Tables 7 and 8 list the lens properties and aspherical values of the imaging lens system according to the embodiment, and FIG. 8 presents aberration curves of the imaging lens system according to the embodiment.

TABLE 7

| Surface No. | Component | Radius of Curvature | Thickness/ Distance | Refractive Index | Abbe Number | Effective Diameter |
|---|---|---|---|---|---|---|
| S1 | First Lens | −73.506 | 1.000 | 1.777 | 49.6 | 5.209 |
| S2 | | 17.566 | 2.455 | | | 4.752 |
| S3 | Second Lens | −7.097 | 2.599 | 1.748 | 44.9 | 4.733 |
| S4 | | −7.661 | 2.360 | | | 5.254 |
| S5 | Stop | Infinity | 0.959 | | | 5.035 |
| S6 | Third Lens | 26.611 | 2.865 | 1.725 | 50.5 | 6.111 |
| S7 | | −13.630 | 0.130 | | | 6.141 |
| S8 | Fourth Lens | 13.000 | 4.095 | 1.701 | 55.0 | 5.919 |
| S9 | Fifth Lens | −15.026 | 0.500 | 1.779 | 24.7 | 5.509 |
| S10 | | 10.450 | 1.845 | | | 4.901 |
| S11 | Sixth Lens | −17.178 | 2.364 | 1.758 | 52.4 | 4.904 |
| S12 | | −11.803 | 2.722 | | | 4.936 |
| S13 | Filter | Infinity | 0.400 | 1.519 | 64.2 | 5.072 |
| S14 | | Infinity | 0.550 | | | 5.083 |
| S15 | Cover Glass | Infinity | 0.400 | 1.519 | 64.2 | 5.106 |
| S16 | | Infinity | 5.256 | | | 5.117 |
| S17 | Imaging Plane | Infinity | 0.000 | | | 5.345 |

TABLE 8

| Surface No. | S3 | S4 | S11 | S12 |
|---|---|---|---|---|
| K | 7.83667E−03 | −1.30191E−01 | 7.89275E+00 | 2.96276E+00 |
| A | −2.90564E−04 | 2.35950E−04 | 9.08003E−04 | 9.33734E−04 |
| B | 2.16128E−05 | 8.82309E−06 | 9.36894E−06 | 1.23129E−05 |
| C | 2.54554E−07 | 1.65942E−07 | −4.42549E−08 | 1.69766E−07 |
| D | −1.10355E−08 | −5.04862E−09 | −2.56948E−09 | 7.21125E−10 |

Figure 9:
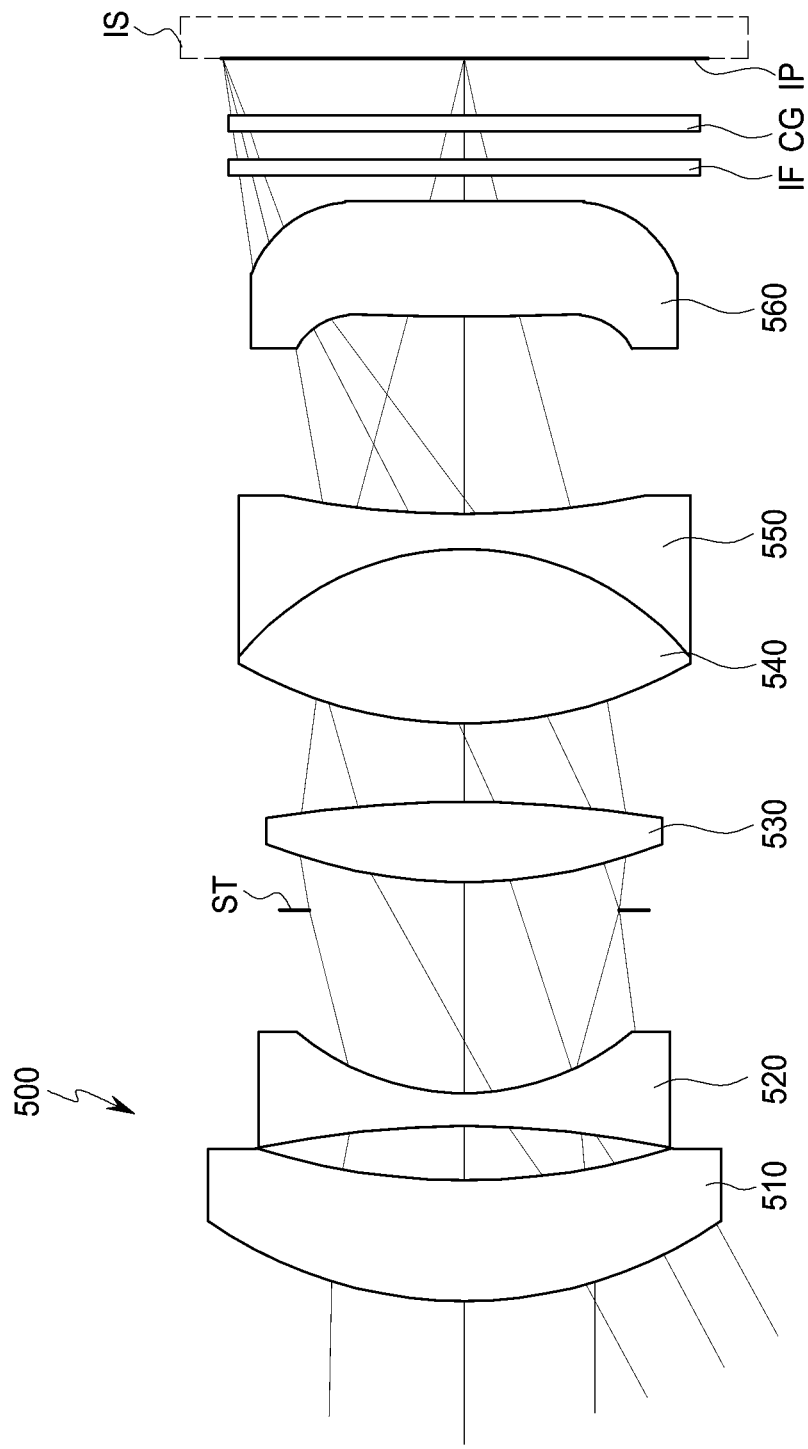
FIG. 9 is a diagram illustrating an imaging lens system according to a fifth embodiment of the present disclosure.

An imaging lens system according to a fifth embodiment will be described with reference to FIG. 9.

The imaging lens system 500 may include a first lens 510, a second lens 520, a third lens 530, a fourth lens 540, a fifth lens 550, and a sixth lens 560.

The first lens 510 may have positive refractive power, and may have a convex object-side surface and a concave image-side surface. The second lens 520 may have negative refractive power, and may have a concave object-side surface and a concave image-side surface. The third lens 530 may have positive refractive power, and may have a convex object-side surface and a convex image-side surface. The fourth lens 540 may have positive refractive power, and may have a convex object-side surface and a convex image-side surface. The fifth lens 550 may have negative refractive power, and may have a concave object-side surface and a concave image-side surface. The sixth lens 560 may have positive refractive power, and may have a convex object-side surface and a concave image-side surface. An inflection point may be formed on the object-side surface and the image-side surface of the sixth lens 560. In the embodiment, the fourth lens 540 and the fifth lens 550 may be bonded to each other. In greater detail, a radius of curvature of the image-side surface of the fourth lens 540 and a radius of curvature of the object-side surface of the fifth lens 550 may be configured to be the same, and an air gap between the image-side surface of the fourth lens 540 and the object-side surface of the fifth lens 550 may be substantially approximate to zero.

The imaging lens system 500 may further include a stop ST, a filter IF, a cover glass CG, and an imaging plane IP. The stop ST may be disposed between the second lens 520 and the third lens 530, and the filter IF and the cover glass CG may be disposed between the sixth lens 560 and the imaging plane IP. The imaging plane IP may be formed in a position in which light incident by the first lens 510 to the sixth lens 560 is formed. For example, the imaging plane IP may be formed on one surface of the image sensor IS of the camera module or within the image sensor IS.

Figure 10:
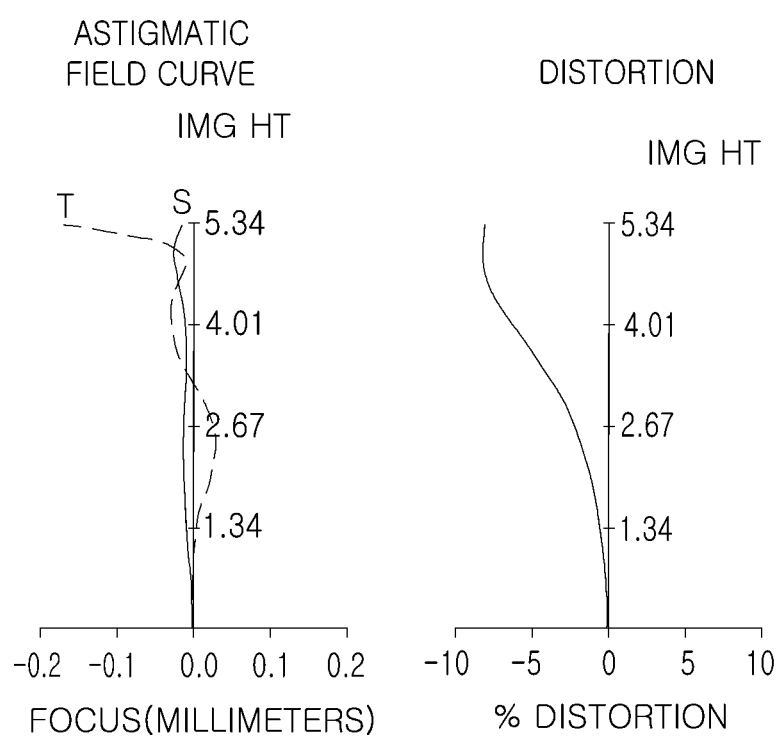
FIG. 10 presents aberration curves of the imaging lens system illustrated in FIG. 9.

Tables 9 and 10 list the lens properties and aspherical values of the imaging lens system according to the embodiment, and FIG. 10 presents aberration curves of the imaging lens system according to the embodiment.

TABLE 9

| Surface No. | Component | Radius of Curvature | Thickness/ Distance | Refractive Index | Abbe Number | Effective Diameter |
|---|---|---|---|---|---|---|
| S1 | First Lens | 10.000 | 2.669 | 1.776 | 49.6 | 5.629 |
| S2 |  | 16.155 | 1.139 |  |  | 4.652 |
| S3 | Second Lens | −20.453 | 0.750 | 1.593 | 42.8 | 4.678 |
| S4 |  | 6.000 | 3.940 |  |  | 3.776 |
| S5 | Stop | Infinity | 0.625 |  |  | 3.335 |
| S6 | Third Lens | 12.275 | 1.676 | 1.823 | 43.0 | 4.232 |
| S7 |  | −29.631 | 1.733 |  |  | 4.295 |
| S8 | Fourth Lens | 10.154 | 3.788 | 1.751 | 46.2 | 4.508 |
| S9 | Fifth Lens | −6.338 | 0.750 | 1.792 | 24.2 | 4.335 |
| S10 |  | 22.460 | 4.330 |  |  | 3.943 |
| S11 | Sixth Lens | 18.087 | 2.450 | 1.585 | 61.0 | 3.680 |
| S12 |  | 29.050 | 0.520 |  |  | 4.691 |
| S13 | Filter | Infinity | 0.400 | 1.519 | 64.2 | 5.001 |
| S14 |  | Infinity | 0.562 |  |  | 5.039 |
| S15 | Cover Glass | Infinity | 0.400 | 1.519 | 64.2 | 5.122 |
| S16 |  | Infinity | 1.178 |  |  | 5.160 |
| S17 | Imaging Plane | Infinity | 0.000 |  |  | 5.345 |

TABLE 10

| Surface No. | S3 | S4 | S11 | S12 |
|---|---|---|---|---|
| K | 9.86586E+00 | −1.15360E+00 | 0.00000E+00 | 1.68552E+01 |
| A | 2.79998E−04 | 5.30376E−04 | −2.77754E−03 | −2.30918E−03 |
| B | 1.76888E−07 | −1.39688E−06 | −1.44029E−04 | −1.18256E−04 |
| C | 1.16564E−07 | 1.37576E−07 | −9.73554E−07 | 3.79047E−06 |
| D |  |  | 4.92115E−07 | −1.03650E−07 |
| E |  |  | −7.32140E−08 |  |

Figure 11:
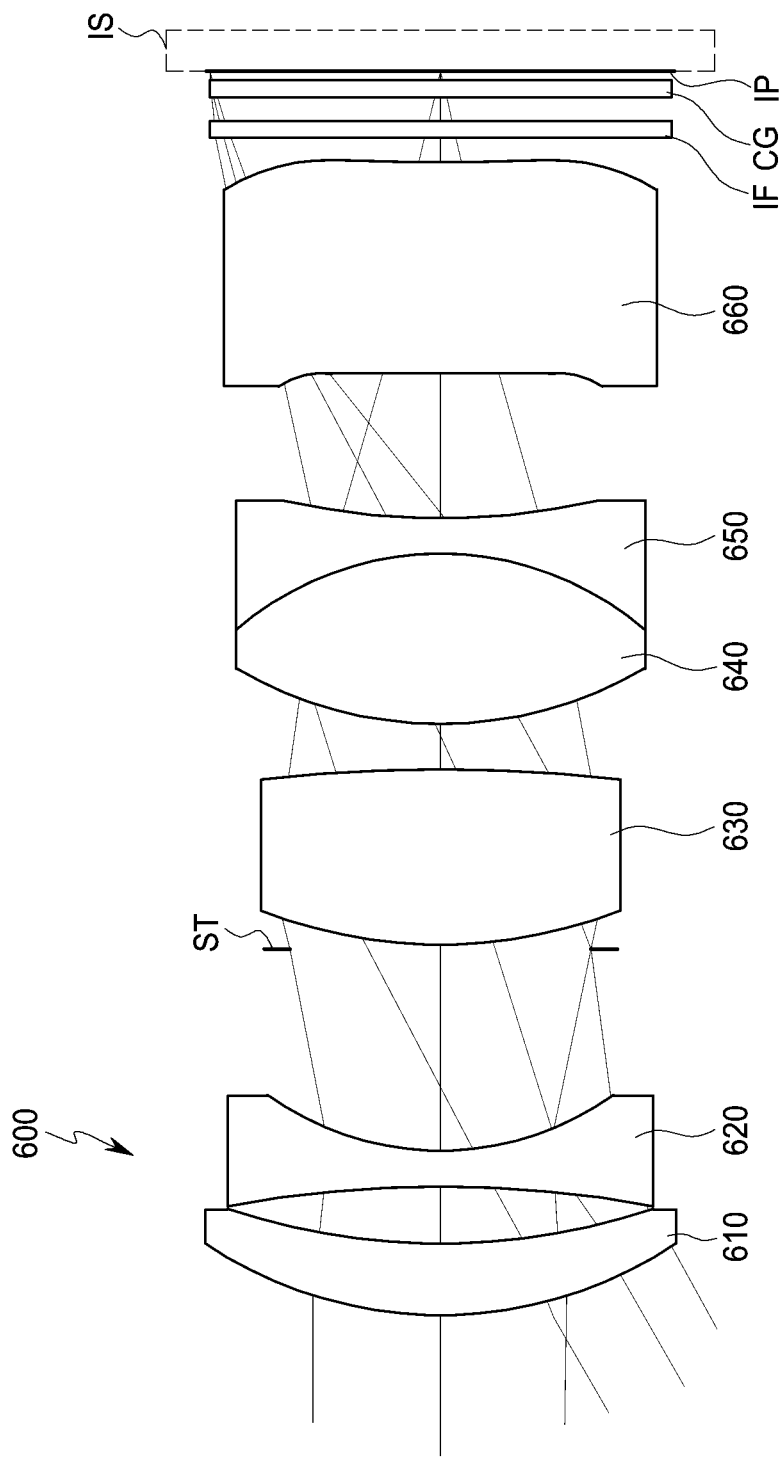
FIG. 11 is a diagram illustrating an imaging lens system according to a sixth embodiment of the present disclosure.

An imaging lens system according to a sixth embodiment will be described with reference to FIG. 11.

The imaging lens system 600 may include a first lens 610, a second lens 620, a third lens 630, a fourth lens 640, a fifth lens 650, and a sixth lens 660.

The first lens 610 may have positive refractive power, and may have a convex object-side surface and a concave image-side surface. The second lens 620 may have negative refractive power, and may have a concave object-side surface and a concave image-side surface. The third lens 630 may have positive refractive power, and may have a convex object-side surface and a convex image-side surface. The fourth lens 640 may have positive refractive power, and may have a convex object-side surface and a convex image-side surface. The fifth lens 650 may have negative refractive power, and may have a concave object-side surface and a concave image-side surface. The sixth lens 660 may have positive refractive power, and may have a convex object-side surface and a concave image-side surface. An inflection point may be formed on the object-side surface and the image-side surface of the sixth lens 660. In the embodiment, the fourth lens 640 and the fifth lens 650 may be bonded to each other. In greater detail, a radius of curvature of the image-side surface of the fourth lens 640 and a radius of curvature of the object-side surface of the fifth lens 650 may be configured to be the same, and an air gap between the image-side surface of the fourth lens 640 and the object-side surface of the fifth lens 650 may be substantially approximate to zero.

The imaging lens system 600 may further include a stop ST, a filter IF, a cover glass CG, and an imaging plane IP. The stop ST may be disposed between the second lens 620 and the third lens 630, and the filter IF and the cover glass CG may be disposed between the sixth lens 660 and the imaging plane IP. The imaging plane IP may be formed in a position in which light incident by the first lens 610 to the sixth lens 660 is formed. For example, the imaging plane IP may be formed on one surface of the image sensor IS of the camera module or within the image sensor IS.

Figure 12:
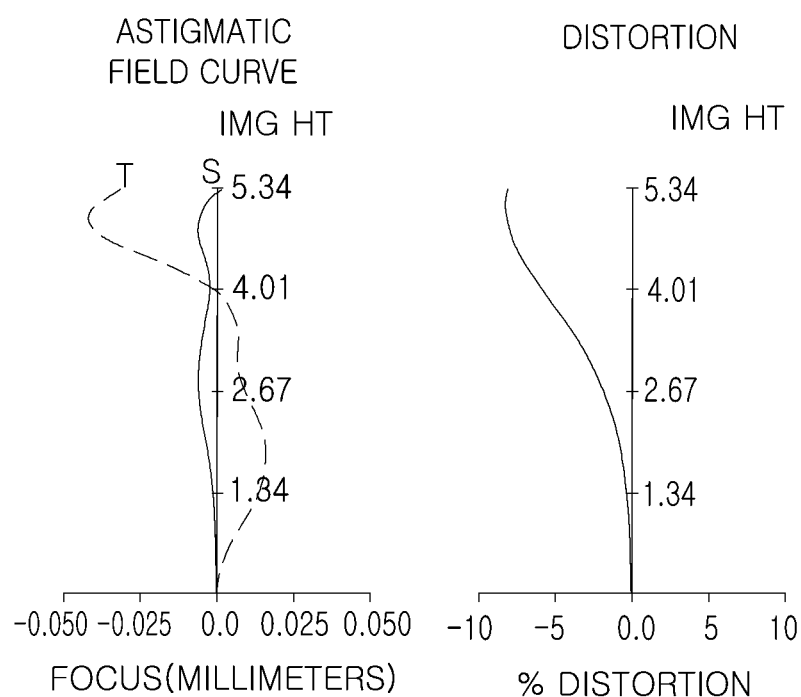
FIG. 12 presents aberration curves of the imaging lens system illustrated in FIG. 11.

Tables 11 and 12 list the lens properties and aspherical values of the imaging lens system according to the embodiment, and FIG. 12 presents aberration curves of the imaging lens system according to the embodiment.

TABLE 11

| Surface No. | Component | Radius of Curvature | Thickness/ Distance | Refractive Index | Abbe Number | Effective Diameter |
|---|---|---|---|---|---|---|
| S1 | First Lens | 10.060 | 1.590 | 1.776 | 49.6 | 5.368 |
| S2 | | 16.146 | 1.276 | | | 4.901 |
| S3 | Second Lens | −20.864 | 0.800 | 1.562 | 42.6 | 4.899 |
| S4 | | 6.715 | 4.575 | | | 3.988 |
| S5 | Stop | Infinity | 0.100 | | | 3.335 |
| S6 | Third Lens | 11.589 | 3.971 | 1.874 | 41.2 | 3.878 |
| S7 | | −38.504 | 1.034 | | | 4.121 |
| S8 | Fourth Lens | 9.457 | 3.836 | 1.742 | 46.7 | 4.244 |
| S9 | Fifth Lens | −7.050 | 0.800 | 1.835 | 23.1 | 3.955 |
| S10 | | 16.667 | 3.245 | | | 3.644 |
| S11 | Sixth Lens | 30.207 | 4.791 | 1.632 | 40.7 | 3.680 |
| S12 | | 33.862 | 0.520 | | | 4.981 |
| S13 | Filter | Infinity | 0.400 | 1.519 | 64.2 | 5.165 |
| S14 | | Infinity | 0.562 | | | 5.206 |
| S15 | Cover Glass | Infinity | 0.400 | 1.519 | 64.2 | 5.295 |
| S16 | | Infinity | 0.101 | | | 5.336 |
| S17 | Imaging Plane | Infinity | 0.000 | | | 5.352 |

TABLE 12

| Surface No. | S3 | S4 | S11 | S12 |
|---|---|---|---|---|
| K | 7.98492E+00 | −1.29231E+00 | 0.00000E+00 | 4.95617E+00 |
| A | 2.54365E−04 | 4.82166E−04 | −1.75631E−03 | −5.55872E−04 |
| B | −3.92538E−07 | −2.03874E−07 | −3.20451E−05 | −9.98970E−05 |
| C | 5.87931E−08 | 9.36439E−08 | −2.51873E−06 | 2.21204E−06 |
| D | | | −2.38878E−08 | |

Figure 13:
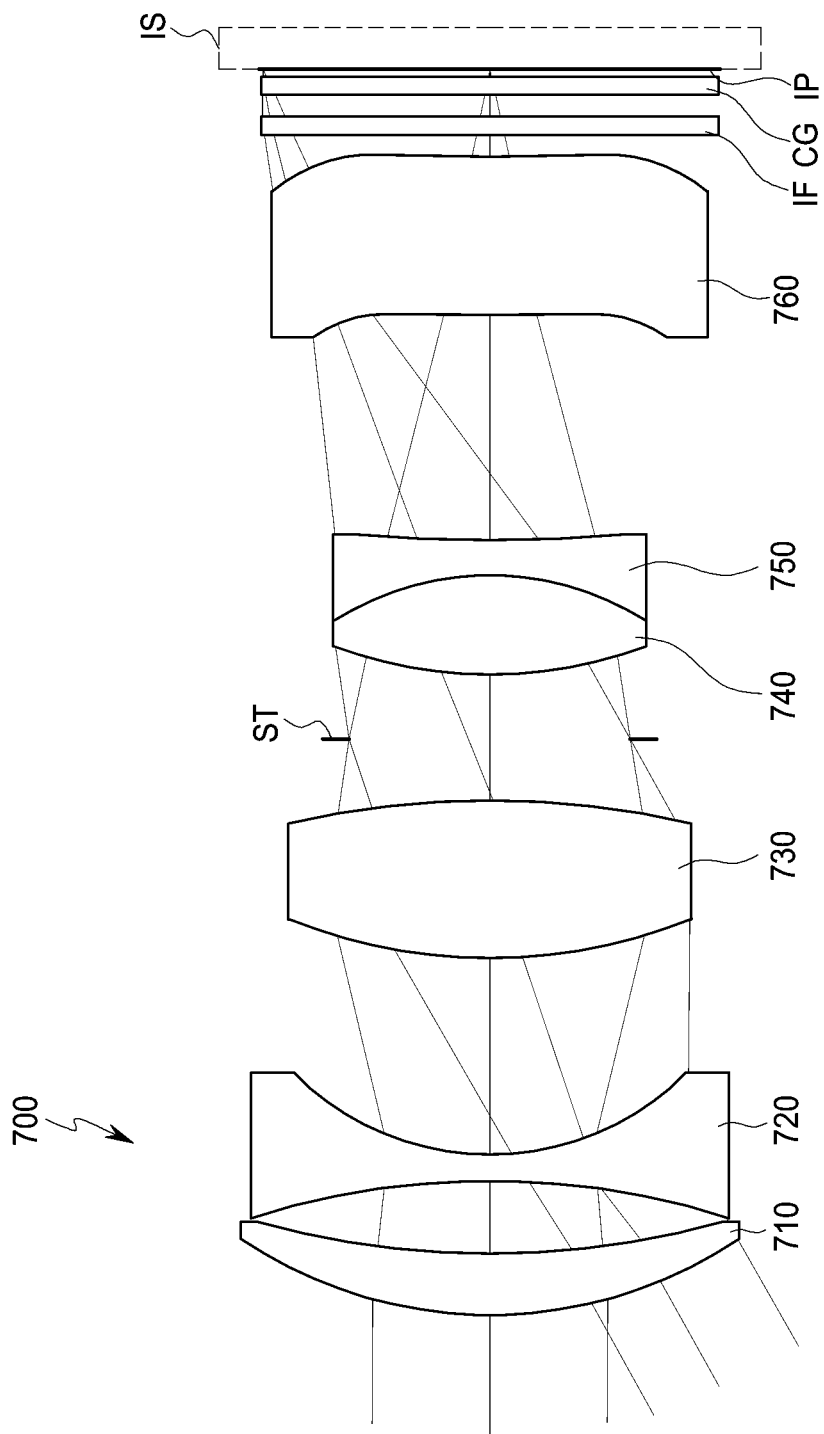
FIG. 13 is a diagram illustrating an imaging lens system according to a seventh embodiment of the present disclosure.

An imaging lens system according to a seventh embodiment will be described with reference to FIG. 13.

The imaging lens system 700 may include a first lens 710, a second lens 720, a third lens 730, a fourth lens 740, a fifth lens 750, and a sixth lens 760.

The first lens 710 may have positive refractive power, and may have a convex object-side surface and a concave image-side surface. The second lens 720 may have negative refractive power, and may have a concave object-side surface and a concave image-side surface. The third lens 730 may have positive refractive power, and may have a convex object-side surface and a convex image-side surface. The fourth lens 740 may have positive refractive power, and may have a convex object-side surface and a convex image-side surface. The fifth lens 750 may have negative refractive power, and may have a concave object-side surface and a concave image-side surface. The sixth lens 760 may have negative refractive power, and may have a convex object-side surface and a concave image-side surface. An inflection point may be formed on the object-side surface and the image-side surface of the sixth lens 760. In the embodiment, the fourth lens 740 and the fifth lens 750 may be bonded to each other. In greater detail, a radius of curvature of the image-side surface of the fourth lens 740 and a radius of curvature of the object-side surface of the fifth lens 750 may be configured to be the same, and an air gap between the image-side surface of the fourth lens 740 and the object-side surface of the fifth lens 750 may be substantially approximate to zero.

The imaging lens system 700 may further include a stop ST, a filter IF, a cover glass CG, and an imaging plane IP. The stop ST may be disposed between the third lens 730 and the fourth lens 740, and the filter IF and the cover glass CG may be disposed between the sixth lens 760 and the imaging plane IP. The imaging plane IP may be formed in a position in which light incident by the first lens 710 to the sixth lens 760 is formed. For example, the imaging plane IP may be formed on one surface of the image sensor IS of the camera module or within the image sensor IS.

Figure 14:
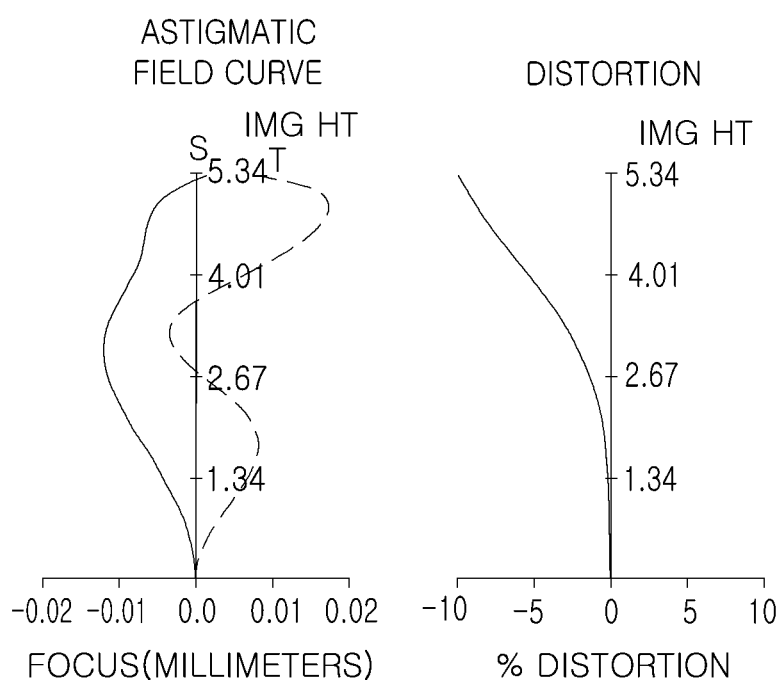
FIG. 14 presents aberration curves of the imaging lens system illustrated in FIG. 13.

Tables 13 and 14 list the lens properties and aspherical values of the imaging lens system according to the embodiment, and FIG. 14 presents aberration curves of the imaging lens system according to the embodiment.

TABLE 13

| Surface No. | Component | Radius of Curvature | Thickness/ Distance | Refractive Index | Abbe Number | Effective Diameter |
|---|---|---|---|---|---|---|
| S1 | First Lens | 10.597 | 1.378 | 1.776 | 49.6 | 5.743 |
| S2 | | 20.366 | 1.600 | | | 5.481 |
| S3 | Second Lens | −15.905 | 0.550 | 1.577 | 38.6 | 5.550 |
| S4 | | 6.000 | 4.452 | | | 4.584 |
| S5 | Third Lens | 12.733 | 3.525 | 1.888 | 40.8 | 4.664 |
| S6 | | −23.591 | 1.428 | | | 4.283 |
| S7 | Stop | Infinity | 1.437 | | | 3.233 |
| S8 | Fourth Lens | 10.354 | 2.262 | 1.697 | 49.5 | 3.609 |
| S9 | Fifth Lens | −6.992 | 0.800 | 1.812 | 23.7 | 3.595 |
| S10 | | 41.748 | 5.089 | | | 3.627 |
| S11 | Sixth Lens | 44.983 | 3.500 | 1.555 | 58.9 | 4.072 |
| S12 | | 31.949 | 0.520 | | | 5.082 |
| S13 | Filter | Infinity | 0.400 | 1.519 | 64.2 | 5.218 |
| S14 | | Infinity | 0.562 | | | 5.246 |
| S15 | Cover Glass | Infinity | 0.400 | 1.519 | 64.2 | 5.306 |
| S16 | | Infinity | 0.100 | | | 5.334 |
| S17 | Imaging Plane | Infinity | 0.000 | | | 5.345 |

TABLE 14

| Surface No. | S3 | S4 | S11 | S12 |
|---|---|---|---|---|
| K | 3.95997E+00 | −1.32152E+00 | 0.00000E+00 | 3.19494E+01 |
| A | 1.92067E−04 | 4.74460E−04 | −1.72200E−03 | 1.34595E+01 |
| B | 1.77871E−06 | −1.03994E−06 | −5.12353E−05 | −3.92632E−04 |
| C | 3.65087E−08 | 5.66446E−08 | 1.65233E−06 | −1.13089E−04 |
| D | | | −2.28035E−07 | 1.77916E−06 |
| E | | | 7.29476E−09 | 3.58179E−08 |
| F | | | | −6.62678E−10 |

Figure 15:
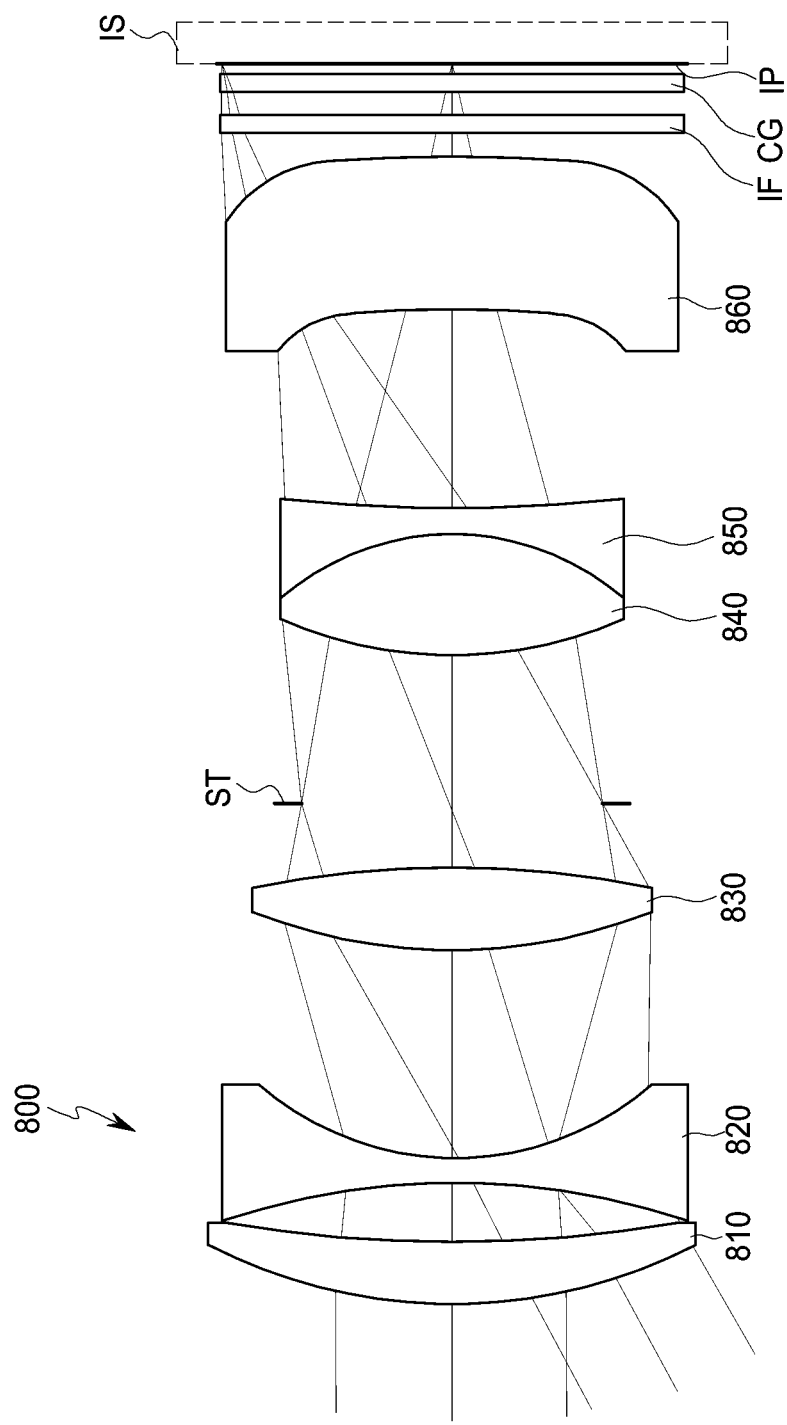
FIG. 15 is a diagram illustrating an imaging lens system according to an eighth embodiment of the present disclosure.

An imaging lens system according to an eighth embodiment will be described with reference to FIG. 15.

The imaging lens system 800 may include a first lens 810, a second lens 820, a third lens 830, a fourth lens 840, a fifth lens 850, and a sixth lens 860.

The first lens 810 may have positive refractive power, and may have a convex object-side surface and a concave image-side surface. The second lens 820 may have negative refractive power, and may have a concave object-side surface and a concave image-side surface. The third lens 830 may have positive refractive power, and may have a convex object-side surface and a convex image-side surface. The fourth lens 840 may have positive refractive power, and may have a convex object-side surface and a convex image-side surface. The fifth lens 850 may have negative refractive power, and may have a concave object-side surface and a concave image-side surface. The sixth lens 860 may have negative refractive power, and may have a concave object-side surface and a concave image-side surface. An inflection point may be formed on the object-side surface and the image-side surface of the sixth lens 860. In the embodiment, the fourth lens 840 and the fifth lens 850 may be bonded to each other. In greater detail, a radius of curvature of the image-side surface of the fourth lens 840 and a radius of curvature of the object-side surface of the fifth lens 850 may be configured to be the same, and an air gap between the image-side surface of the fourth lens 840 and the object-side surface of the fifth lens 850 may be substantially approximate to zero.

The imaging lens system 800 may further include a stop ST, a filter IF, a cover glass CG, and an imaging plane IP. The stop ST may be disposed between the third lens 830 and the fourth lens 840, and the filter IF and the cover glass CG may be disposed between the sixth lens 860 and the imaging plane IP. The imaging plane IP may be formed in a position in which light incident by the first lens 810 to the sixth lens 860 is formed. For example, the imaging plane IP may be formed on one surface of the image sensor IS of the camera module or within the image sensor IS.

Figure 16:
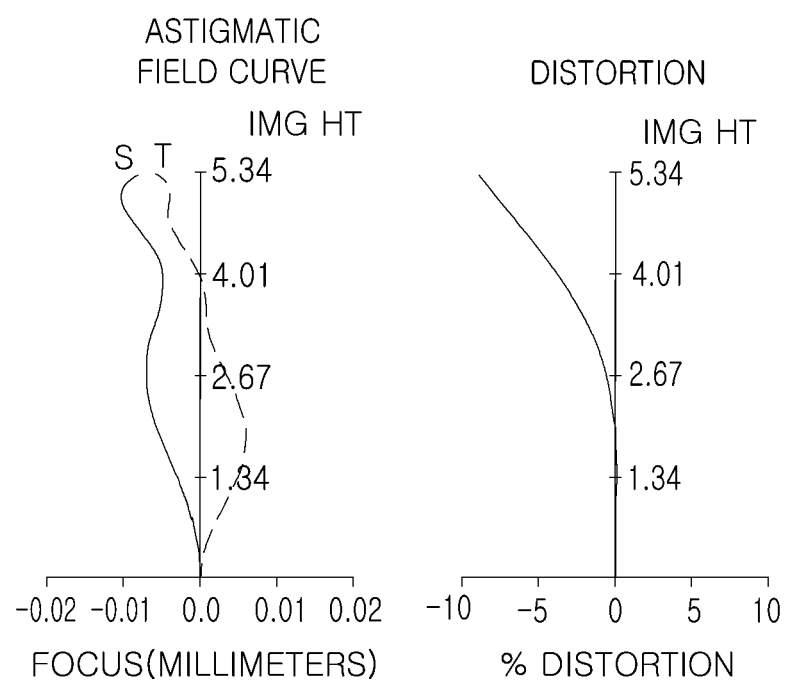
FIG. 16 presents aberration curves of the imaging lens system illustrated in FIG. 15.

Tables 15 and 16 list the lens properties and aspherical values of the imaging lens system according to the embodiment, and FIG. 16 presents aberration curves of the imaging lens system according to the embodiment.

TABLE 15

| Surface No. | Component | Radius of Curvature | Thickness/ Distance | Refractive Index | Abbe Number | Effective Diameter |
|---|---|---|---|---|---|---|
| S1 | First Lens | 12.858 | 1.364 | 1.776 | 49.6 | 5.603 |
| S2 | | 30.158 | 1.373 | | | 5.312 |
| S3 | Second Lens | −15.545 | 0.550 | 1.620 | 33.3 | 5.309 |
| S4 | | 6.075 | 4.692 | | | 4.498 |
| S5 | Third Lens | 12.195 | 1.894 | 1.888 | 40.8 | 4.632 |
| S6 | | −22.267 | 1.420 | | | 4.548 |
| S7 | Stop | Infinity | 3.371 | | | 3.516 |
| S8 | Fourth Lens | 10.913 | 2.729 | 1.764 | 45.6 | 3.987 |
| S9 | Fifth Lens | −6.176 | 0.550 | 1.847 | 22.8 | 3.618 |
| S10 | | 30.465 | 4.442 | | | 3.872 |
| S11 | Sixth Lens | −210.780 | 3.500 | 1.674 | 51.2 | 4.030 |
| S12 | | 2476.692 | 0.520 | | | 5.291 |
| S13 | Filter | Infinity | 0.400 | 1.519 | 64.2 | 5.323 |
| S14 | | Infinity | 0.562 | | | 5.327 |
| S15 | Cover Glass | Infinity | 0.400 | 1.519 | 64.2 | 5.336 |
| S16 | | Infinity | 0.235 | | | 5.340 |
| S17 | Imaging Plane | Infinity | 0.000 | | | 5.345 |

TABLE 16

| Surface No. | S3 | S4 | S5 | S6 | S11 | S12 |
|---|---|---|---|---|---|---|
| K | 2.21547E+00 | −1.44874E+00 | −4.60294E−01 | 1.98166E−02 | 0.00000E+00 | 0.00000E+00 |
| A | 9.68423E−05 | 3.93995E−04 | −3.85667E−05 | 1.57301E−07 | −1.95405E−03 | −7.24813E−04 |
| B | 1.64792E−06 | −3.36259E−06 | −6.82706E−07 | −1.15687E−07 | −5.97650E−05 | −1.01180E−04 |
| C | | | | | 5.10232E−07 | 3.13782E−06 |
| D | | | | | −1.08215E−07 | −3.61878E−08 |

Figure 17:
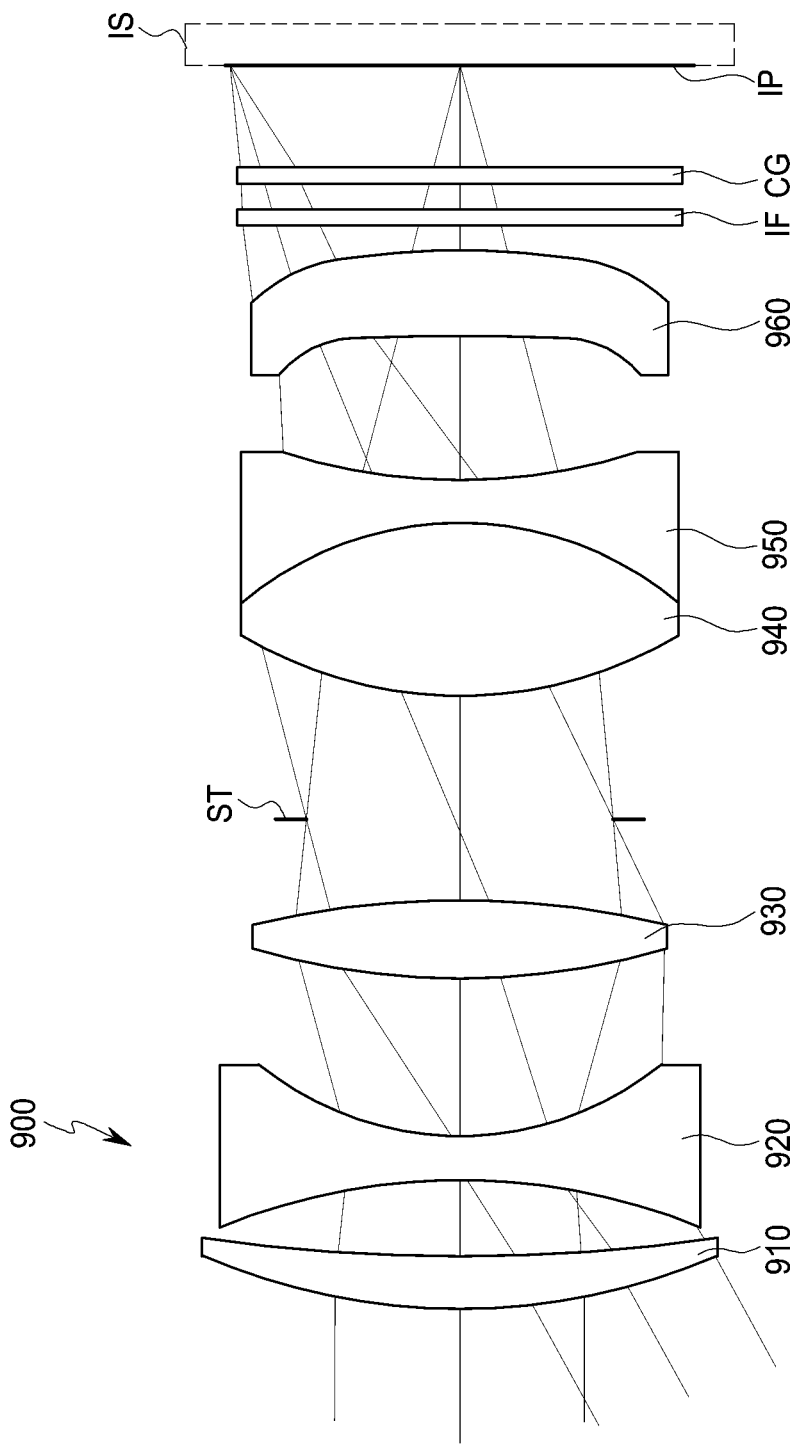
FIG. 17 is a diagram illustrating an imaging lens system according to a ninth embodiment of the present disclosure.

An imaging lens system according to a ninth embodiment will be described with reference to FIG. 17.

The imaging lens system 900 may include a first lens 910, a second lens 920, a third lens 930, a fourth lens 940, a fifth lens 950, and a sixth lens 960.

The first lens 910 may have positive refractive power, and may have a convex object-side surface and a concave image-side surface. The second lens 920 may have negative refractive power, and may have a concave object-side surface and a concave image-side surface. The third lens 930 may have positive refractive power, and may have a convex object-side surface and a convex image-side surface. The fourth lens 940 may have positive refractive power, and may have a convex object-side surface and a convex image-side surface. The fifth lens 950 may have negative refractive power, and may have a concave object-side surface and a concave image-side surface. The sixth lens 960 may have positive refractive power, and may have a convex object-side surface and a convex image-side surface. An inflection point may be formed on the object-side surface and the image-side surface of the sixth lens 960. In the embodiment, the fourth lens 940 and the fifth lens 950 may be bonded to each other. In greater detail, a radius of curvature of the image-side surface of the fourth lens 940 and a radius of curvature of the object-side surface of the fifth lens 950 may be configured to be the same, and an air gap between the image-side surface of the fourth lens 940 and the object-side surface of the fifth lens 950 may be substantially approximate to zero.

The imaging lens system 900 may further include a stop ST, a filter IF, a cover glass CG, and an imaging plane IP. The stop ST may be disposed between the third lens 930 and the fourth lens 940, and the filter IF and the cover glass CG may be disposed between the sixth lens 960 and the imaging plane IP. The imaging plane IP may be formed in a position in which light incident by the first lens 910 to the sixth lens 960 is formed. For example, the imaging plane IP may be formed on one surface of the image sensor IS of the camera module or within the image sensor IS.

Figure 18:
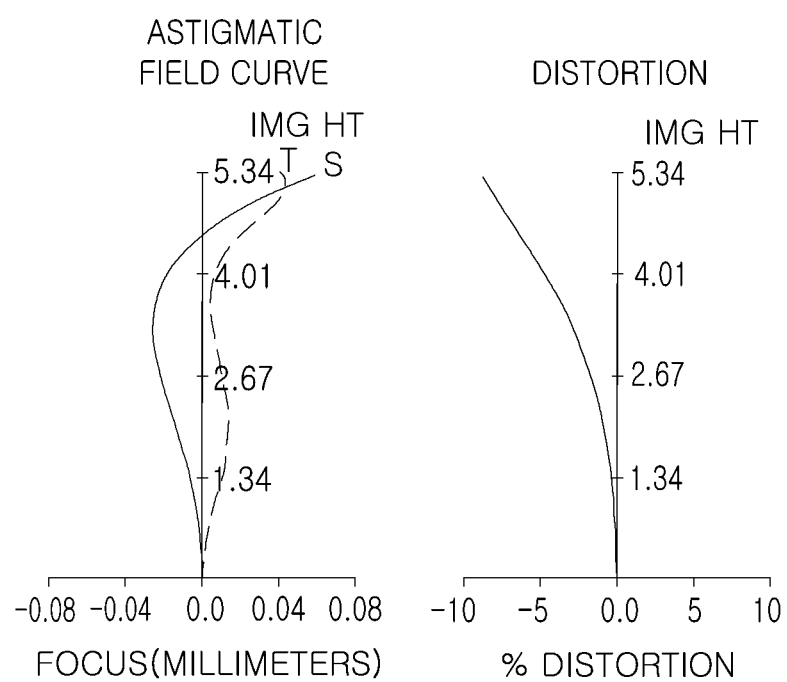
FIG. 18 presents aberration curves of the imaging lens system illustrated in FIG. 17.

Tables 17 and 18 list the lens properties and aspherical values of the imaging lens system according to the embodiment, and FIG. 18 presents aberration curves of the imaging lens system according to the embodiment.

TABLE 17

| Surface No. | Component | Radius of Curvature | Thickness/ Distance | Refractive Index | Abbe Number | Effective Diameter |
|---|---|---|---|---|---|---|
| S1 | First Lens | 15.589 | 1.191 | 1.776 | 49.6 | 5.921 |
| S2 | | 44.650 | 1.700 | | | 5.728 |
| S3 | Second Lens | −12.023 | 1.000 | 1.596 | 35.8 | 5.562 |
| S4 | | 7.285 | 3.502 | | | 4.646 |
| S5 | Third Lens | 16.102 | 1.800 | 1.888 | 40.8 | 4.772 |
| S6 | | −21.235 | 1.830 | | | 4.707 |
| S7 | Stop | Infinity | 2.771 | | | 3.530 |
| S8 | Fourth Lens | 9.993 | 3.916 | 1.870 | 41.3 | 4.578 |
| S9 | Fifth Lens | −8.042 | 1.000 | 1.863 | 22.5 | 4.418 |
| S10 | | 15.076 | 3.151 | | | 4.267 |
| S11 | Sixth Lens | 34.179 | 1.943 | 1.584 | 61.2 | 4.158 |
| S12 | | −90.077 | 0.520 | | | 4.785 |
| S13 | Filter | Infinity | 0.400 | 1.519 | 64.2 | 4.971 |
| S14 | | Infinity | 0.562 | | | 5.000 |
| S15 | Cover Glass | Infinity | 0.400 | 1.519 | 64.2 | 5.063 |
| S16 | | Infinity | 2.314 | | | 5.092 |
| S17 | Imaging Plane | Infinity | 0.000 | | | 5.348 |

TABLE 18

| Surface No. | S3 | S4 | S11 | S12 |
|---|---|---|---|---|
| K | 1.29022E+00 | −1.57016E+00 | 5.71980E+01 | 0.00000E+00 |
| A | 2.67662E−04 | 3.88988E−04 | −2.00205E−03 | −8.33606E−04 |
| B | 3.74058E−06 | 2.62589E−06 | −8.14225E−05 | −8.65352E−05 |
| C | −1.65000E−08 | 1.73519E−08 | −1.73308E−06 | 1.60419E−06 |

Figure 19:
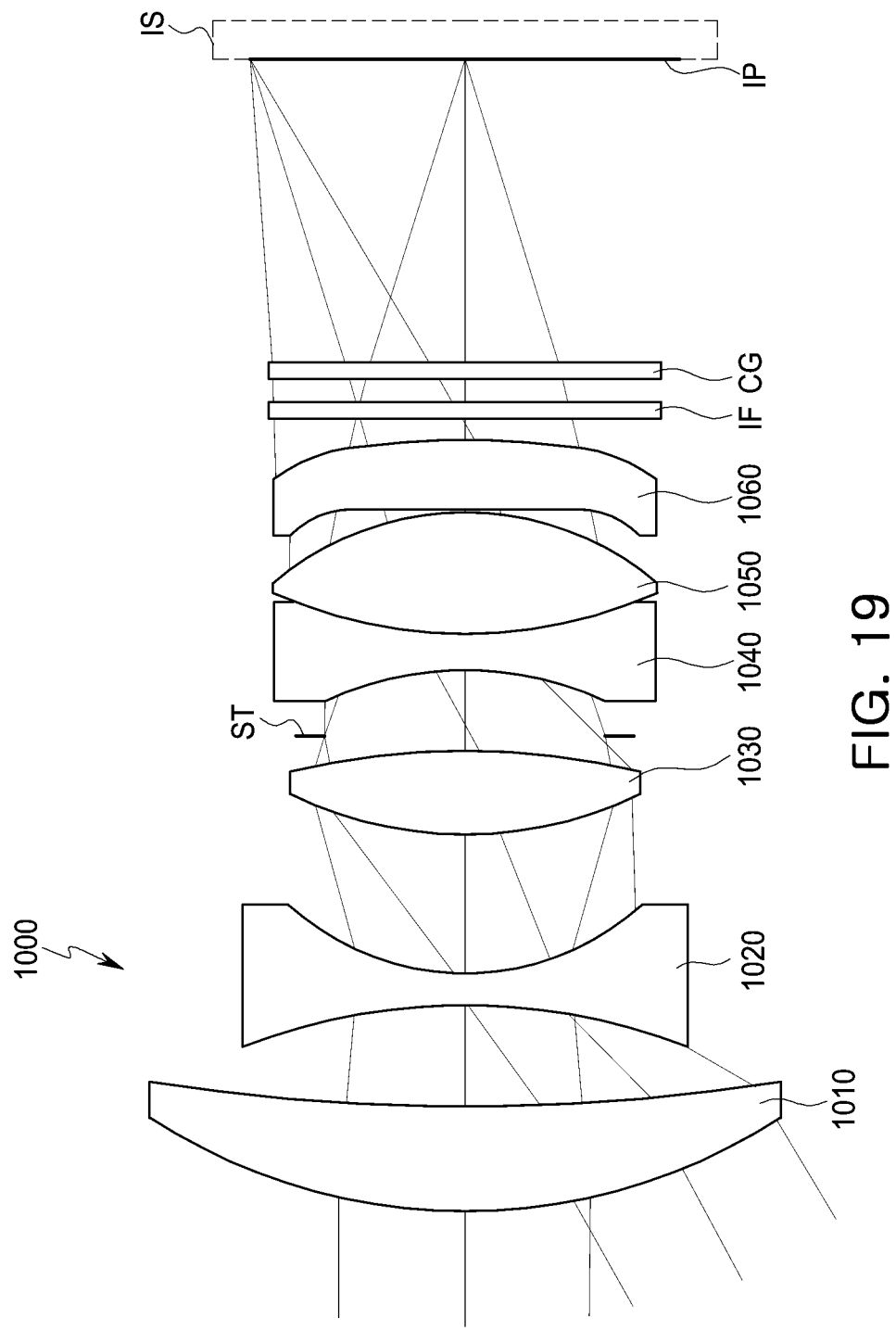
FIG. 19 is a diagram illustrating an imaging lens system according to a tenth embodiment of the present disclosure.

An imaging lens system according to a tenth embodiment will be described with reference to FIG. 19.

The imaging lens system 1000 may include a first lens 1010, a second lens 1020, a third lens 1030, a fourth lens 1040, a fifth lens 1050, and a sixth lens 1060.

The first lens 1010 may have positive refractive power, and may have a convex object-side surface and a concave image-side surface. The second lens 1020 may have negative refractive power, and may have a concave object-side surface and a concave image-side surface. The third lens 1030 may have positive refractive power, and may have a convex object-side surface and a convex image-side surface. The fourth lens 1040 may have negative refractive power, and may have a concave object-side surface and a concave image-side surface. The fifth lens 1050 may have positive refractive power, and may have a convex object-side surface and a convex image-side surface. The sixth lens 1060 may have positive refractive power, and may have a convex object-side surface and a convex image-side surface. An inflection point may be formed on the object-side surface and the image-side surface of the sixth lens 1060. In the embodiment, the fourth lens 1040 and the fifth lens 1050 may be bonded to each other. In greater detail, a radius of curvature of the image-side surface of the fourth lens 1040 and a radius of curvature of the object-side surface of the fifth lens 1050 may be configured to be the same, and an air gap between the image-side surface of the fourth lens 1040 and the object-side surface of the fifth lens 1050 may be substantially approximate to zero.

The imaging lens system 1000 may further include a stop ST, a filter IF, a cover glass CG, and an imaging plane IP. The stop ST may be disposed between the third lens 1030 and the fourth lens 1040, and the filter IF and the cover glass CG may be disposed between the sixth lens 1060 and the imaging plane IP. The imaging plane IP may be formed in a position in which light incident by the first lens 1010 to the sixth lens 1060 is formed. For example, the imaging plane IP may be formed on one surface of the image sensor IS of the camera module or within the image sensor IS.

Figure 20:
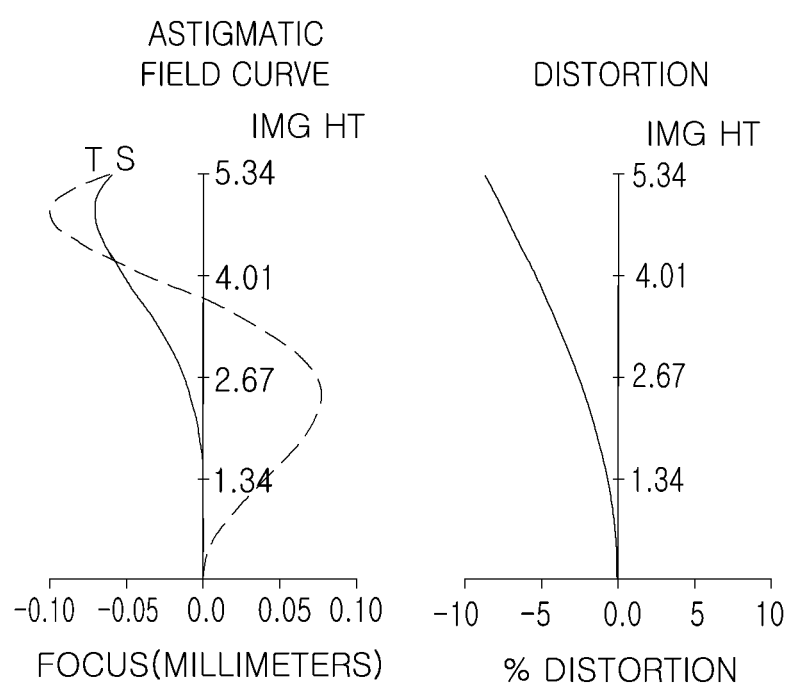
FIG. 20 presents aberration curves of the imaging lens system illustrated in FIG. 19.

Tables 19 and 20 list the lens properties and aspherical values of the imaging lens system according to the embodiment, and FIG. 20 presents aberration curves of the imaging lens system according to the embodiment.

TABLE 19

| Surface No. | Component | Radius of Curvature | Thickness/ Distance | Refractive Index | Abbe Number | Effective Diameter |
|---|---|---|---|---|---|---|
| S1 | First Lens | 17.587 | 2.540 | 1.776 | 49.6 | 7.829 |
| S2 | | 61.414 | 2.455 | | | 7.249 |
| S3 | Second Lens | −15.051 | 0.750 | 1.555 | 45.4 | 5.489 |
| S4 | | 6.430 | 3.375 | | | 4.384 |
| S5 | Third Lens | 9.849 | 2.065 | 1.888 | 40.8 | 4.341 |
| S6 | | −19.357 | 0.379 | | | 4.203 |
| S7 | Stop | Infinity | 1.613 | | | 3.439 |
| S8 | Fourth Lens | −7.863 | 0.845 | 1.785 | 24.5 | 3.502 |
| S9 | Fifth Lens | 11.594 | 2.975 | 1.735 | 47.1 | 4.125 |
| S10 | | −7.346 | 0.100 | | | 4.346 |
| S11 | Sixth Lens | 86.660 | 1.644 | 1.576 | 62.4 | 4.323 |
| S12 | | −33.583 | 0.520 | | | 4.701 |
| S13 | Filter | Infinity | 0.400 | 1.519 | 64.2 | 4.786 |
| S14 | | Infinity | 0.562 | | | 4.802 |
| S15 | Cover Glass | Infinity | 0.400 | 1.519 | 64.2 | 4.835 |
| S16 | | Infinity | 7.378 | | | 4.851 |
| S17 | Imaging Plane | Infinity | 0.000 | | | 5.410 |

TABLE 20

| Surface No. | S1 | S2 | S11 | S12 |
|---|---|---|---|---|
| K | 0.00000E+00 | 0.00000E+00 | 0.00000E+00 | 2.02040E+00 |
| A | −6.01462E−05 | −1.06559E−04 | −1.15624E−03 | −6.15169E−04 |
| B | 1.03259E−06 | 9.75900E−07 | −4.70360E−05 | −4.7779E−05 |
| C | 2.11703E−08 | 9.80144E−08 | −4.73566E−07 | 9.05485E−07 |
| D | 1.23817E−10 | −1.31001E−09 | | |

Tables 21 and 22 list optical properties values and conditional expression values of the imaging lens system according to the first to tenth embodiments.

TABLE 21

| Element | First Embodiment | Second Embodiment | Third Embodiment | Fourth Embodiment | Fifth Embodiment |
|---|---|---|---|---|---|
| f1 | 30.6781 | −25.6577 | 50.0785 | −18.1688 | 28.4288 |
| f2 | −7.2172 | −35.5687 | −7.5821 | 132.3524 | −7.7388 |
| f3 | 9.3027 | 16.6446 | 6.6563 | 12.8088 | 10.7442 |
| f4 | 6.0497 | 12.5773 | −4.0193 | 10.5756 | 5.7641 |

TABLE 21-continued

| | | | | | |
|---|---|---|---|---|---|
| f5 | −6.0578 | −7.8783 | 5.0428 | −7.8469 | −6.1698 |
| f6 | 86.5118 | 12.7962 | 24.6791 | 41.8441 | 75.6678 |
| TTL | 27.9999 | 32.3580 | 31.9997 | 30.4987 | 26.9097 |
| f | 10.2379 | 10.5342 | 10.1371 | 10.4572 | 10.6029 |
| f number | 1.6500 | 1.6406 | 2.0000 | 1.6188 | 1.7998 |
| ImgH | 5.1430 | 5.1450 | 5.1450 | 5.1450 | 5.1430 |
| HFOV | 46.0000 | 45.0000 | 46.0000 | 45.0000 | 45.0100 |
| DFOV | 57.2600 | 58.6500 | 60.1200 | 58.4700 | 57.3300 |
| f45 | 33.7940 | −58.662 | 27.9498 | 69.6337 | 25.0562 |

| Element | Sixth Embodiment | Seventh Embodiment | Eighth Embodiment | Ninth Embodiment | Tenth Embodiment |
|---|---|---|---|---|---|
| f1 | 30.8597 | 26.8100 | 27.9143 | 30.3132 | 30.9647 |
| f2 | −8.9502 | −7.4856 | −6.9816 | −7.4729 | −8.0129 |
| f3 | 10.5820 | 9.7570 | 9.1079 | 10.5510 | 7.6032 |
| f4 | 6.0407 | 6.3284 | 5.5477 | 5.6949 | −5.8534 |
| f5 | −5.8416 | −7.3215 | −6.0201 | −5.9610 | 6.5574 |
| f6 | 293.7318 | −219.6987 | −288.1368 | 42.6728 | 42.2088 |
| TTL | 28.0008 | 28.0000 | 28.0000 | 28.0001 | 28.0000 |
| f | 10.5609 | 10.5168 | 10.3530 | 10.4413 | 10.2596 |
| f number | 1.7998 | 1.9310 | 1.9310 | 1.8073 | 1.6500 |
| ImgH | 5.1430 | 5.1430 | 5.1430 | 5.1430 | 5.1430 |
| HFOV | 45.0000 | 45.0000 | 45.0000 | 45.0000 | 46.0000 |
| DFOV | 55.7800 | 58.7400 | 59.0200 | 58.5100 | 57.1500 |
| f45 | 36.2855 | 28.6208 | 29.7439 | 22.8249 | 54.9889 |

TABLE 22

| Conditional Expression | First Embodiment | Second Embodiment | Third Embodiment | Fourth Embodiment | Fifth Embodiment |
|---|---|---|---|---|---|
| D1/HFOV | 0.2625 | 0.2567 | 0.2984 | 0.2315 | 0.2501 |
| DFOV/f | 5.5929 | 5.5676 | 5.9307 | 5.5914 | 5.4070 |
| ImgH/TTL | 0.1837 | 0.1590 | 0.1608 | 0.1687 | 0.1911 |
| TTL/f | 2.7349 | 3.0717 | 3.1567 | 2.9165 | 2.5380 |
| $|f/f3|$ | 1.1005 | 0.6329 | 1.5229 | 0.8164 | 0.9869 |
| D1/TTL | 0.4312 | 0.3570 | 0.4289 | 0.3416 | 0.4183 |
| f2/f3 | −0.7758 | −2.1369 | −1.1391 | 10.3329 | −0.7203 |
| f4/f5 | −0.9987 | −1.5965 | −0.7970 | −1.3477 | −0.9343 |
| ImgH/f | 0.5023 | 0.4884 | 0.5075 | 0.4920 | 0.4851 |
| (R5 + R6)/(R5 − R6) | −0.2543 | −0.5289 | −0.2604 | 0.3226 | −0.4142 |
| (R2 + R6)/(R2 − R6) | 0.0428 | −0.1750 | −0.3171 | 0.1262 | −0.2943 |
| (Nd1 + Nd3)/2 | 1.8322 | 1.5737 | 1.7778 | 1.7510 | 1.7995 |
| (Nd1 + Nd3 + Nd5)/3 | 1.8257 | 1.6358 | 1.7790 | 1.7603 | 1.7970 |
| (V1 + V2 + V3 + V4)/4 | 45.1935 | 60.1965 | 38.2623 | 49.9870 | 45.4195 |
| SumV/6 | 44.4783 | 52.5558 | 44.4018 | 46.1772 | 44.4942 |
| SumNd/6 | 1.7242 | 1.7065 | 1.7726 | 1.7481 | 1.7201 |
| D12/D23 | 0.5151 | 0.6562 | 0.5811 | 0.7398 | 0.2494 |

| Conditional Expression | Sixth Embodiment | Seventh Embodiment | Eighth Embodiment | Ninth Embodiment | Tenth Embodiment |
|---|---|---|---|---|---|
| D1/HFOV | 0.2386 | 0.2552 | 0.2490 | 0.2632 | 0.3404 |
| DFOV/f | 5.2817 | 5.5853 | 5.7008 | 5.6037 | 5.5704 |
| ImgH/TTL | 0.1837 | 0.1837 | 0.1837 | 0.1837 | 0.1837 |
| TTL/f | 2.6514 | 2.6624 | 2.7045 | 2.6817 | 2.7291 |
| $|f/f3|$ | 0.9980 | 1.0779 | 1.1367 | 0.9896 | 1.3494 |
| D1/TTL | 0.3834 | 0.4102 | 0.4002 | 0.4229 | 0.5592 |
| f2/f3 | −0.8458 | −0.7672 | −0.7665 | −0.7083 | −1.0539 |
| f4/f5 | −1.0341 | −0.8644 | −0.9215 | −0.9554 | −0.8927 |
| ImgH/f | 0.4870 | 0.4890 | 0.4968 | 0.4926 | 0.5013 |
| (R5 + R6)/(R5 − R6) | −0.5373 | −0.2989 | −0.2922 | −0.1375 | −0.3255 |
| (R2 + R6)/(R2 − R6) | −0.4091 | −0.0734 | 0.1505 | 0.3554 | 0.5207 |
| (Nd1 + Nd3)/2 | 1.8252 | 1.8322 | 1.8322 | 1.8322 | 1.8322 |
| (Nd1 + Nd3 + Nd5)/3 | 1.8285 | 1.8254 | 1.8371 | 1.8423 | 1.7996 |
| (V1 + V2 + V3 + V4)/4 | 45.0283 | 44.6395 | 42.3168 | 41.8880 | 40.0828 |
| SumV/6 | 40.6648 | 43.5157 | 40.5518 | 41.8698 | 44.9780 |
| SumNd/6 | 1.7369 | 1.7175 | 1.7614 | 1.7628 | 1.7193 |
| D12/D23 | 0.2730 | 0.3594 | 0.2926 | 0.4855 | 0.7275 |

According to the aforementioned embodiments, an imaging lens system which may reduce changes in sizes of lenses and may implement high resolution may be provided.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
a first lens, a second lens, a third lens, a fourth lens, a fifth lens, and a sixth lens sequentially disposed in ascending numerical order along an optical axis of the imaging lens system from an object side of the imaging lens system toward an imaging plane of the imaging lens system,
wherein the sixth lens has a convex object-side surface in a paraxial region thereof, and
the imaging lens system satisfies the following conditional expressions:

$0.23$ mm/°$<D1/HFOV<0.35$ mm/°

$0.15<ImgH/TTL<0.20$ where D1 is an effective diameter of the first lens, HFOV is a field of view of the imaging plane in a horizontal direction, ImgH is a height of the imaging plane, and TTL is a distance along the optical axis from an object-side surface of the first lens to the imaging plane.

2. The imaging lens system of claim 1, wherein the first lens has a concave image-side surface in a paraxial region thereof.

3. The imaging lens system of claim 1, wherein the third lens has a convex object-side surface in a paraxial region thereof.

4. The imaging lens system of claim 1, wherein the fourth lens has a convex object-side surface in a paraxial region thereof.

5. The imaging lens system of claim 1, wherein the fifth lens has a concave object-side surface in a paraxial region thereof.

6. The imaging lens system of claim 1, wherein the sixth lens has a positive refractive power.

7. The imaging lens system of claim 1, wherein the imaging lens system further satisfies the following conditional expression:

$2.5<TTL/f<3.2$ where f is a focal length of the imaging lens system.

8. The imaging lens system of claim 1, wherein the imaging lens system further satisfies the following conditional expression:

$0.6<|f/f3|<1.6$ where f is a focal length of the imaging lens system, and f3 is a focal length of the third lens.

9. The imaging lens system of claim 1, wherein the imaging lens system further satisfies the following conditional expression:

$0.3<D1/TTL<0.6.$

10. The imaging lens system of claim 1, wherein the imaging lens system further satisfies the following conditional expression:

$f2/f3<0$ where f2 is a focal length of the second lens, and f3 is a focal length of the third lens.

11. The imaging lens system of claim 1, wherein the imaging lens system further satisfies the following conditional expression:

$f4/f5<0$ where f4 is a focal length of the fourth lens, and f5 is a focal length of the fifth lens.

12. An imaging lens system comprising:
a first lens having a concave image-side surface in a paraxial region thereof;
a second lens having a refractive power;
a third lens having a positive refractive power and a convex image-side surface in a paraxial region thereof;
a fourth lens having a refractive power;
a fifth lens having a refractive power; and
a sixth lens having a refractive power and a concave object-side surface in a paraxial region thereof,
wherein the first to sixth lenses are sequentially disposed in ascending numerical order along an optical axis of the imaging lens system from an object side of the imaging lens system toward an imaging plane of the imaging lens system, and
the imaging lens system satisfies the following conditional expression:

$2.5<TTL/f<3.2$ where f is a focal length of the imaging lens system, and TTL is a distance along the optical axis from an object-side surface of the first lens to the imaging plane.

13. The imaging lens system of claim 12, wherein the imaging lens system further satisfies the following conditional expression:

$-2.4<f2/f3<-0.6$ where f2 is a focal length of the second lens, and f3 is a focal length of the third lens.

14. The imaging lens system of claim 12, wherein the imaging lens system further satisfies the following conditional expression:

$-1.6<f4/f5<-0.8$ where f4 is a focal length of the fourth lens, and f5 is a focal length of the fifth lens.

15. The imaging lens system of claim 12, wherein the imaging lens system further satisfies the following conditional expression:

$1.6<f \text{ number }<2.1.$

16. The imaging lens system of claim 12, wherein the imaging lens system further satisfies the following conditional expression:

$0.4<ImgH/f<0.6$ where ImgH is a height of the imaging plane.

17. An imaging lens system comprising:
a first lens having a concave image-side surface in a paraxial region thereof;
a second lens having a refractive power;
a third lens having a positive refractive power and a convex image-side surface in a paraxial region thereof;
a fourth lens having a refractive power;
a fifth lens having a refractive power; and
a sixth lens having a refractive power,
wherein the first to sixth lenses are sequentially disposed in ascending numerical order along an optical axis of the imaging lens system from an object side of the imaging lens system toward an imaging plane of the imaging lens system, and
the imaging lens system satisfies the following conditional expression:

$$0.23 \text{ mm}/° < D1/HFOV < 0.35 \text{ mm}/°$$

where D1 is an effective diameter of the first lens, and HFOV is a field of view of the imaging plane in a horizontal direction.

18. The imaging lens system of claim 17, wherein the imaging lens system further satisfies the following conditional expression:

$$0.15 < ImgH/TTL < 0.20$$

where ImgH is a height of the imaging plane, and TTL is a distance along the optical axis from an object-side surface of the first lens to the imaging plane.

19. The imaging lens system of claim 17, wherein the imaging lens system further satisfies the following conditional expression:

$$2.5 < TTL/f < 3.2$$

where f is a focal length of the imaging lens system, and TTL is a distance along the optical axis from an object-side surface of the first lens to the imaging plane.

20. The imaging lens system of claim 17, wherein the fourth lens has a convex object-side surface in a paraxial region thereof, and
the fifth lens has a concave object-side surface in a paraxial region thereof.

* * * * *